(12) United States Patent
Maeda et al.

(10) Patent No.: US 6,628,357 B1
(45) Date of Patent: Sep. 30, 2003

(54) LIQUID CRYSTAL DEVICE AND ELECTRONIC DEVICE

(75) Inventors: Tsuyoshi Maeda, Yamanashi-ken (JP); Eiji Okamoto, Matsumoto (JP); Takumi Seki, Misato-mura (JP); Osamu Okumura, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/402,557

(22) PCT Filed: Jan. 26, 1999

(86) PCT No.: PCT/JP99/00311
§ 371 (c)(1),
(2), (4) Date: Oct. 4, 1999

(87) PCT Pub. No.: WO99/40479
PCT Pub. Date: Aug. 12, 1999

(30) Foreign Application Priority Data

Feb. 4, 1998 (JP) ............................................ 10-023656
Jun. 5, 1998 (JP) ............................................ 10-157622

(51) Int. Cl.⁷ ............................................ G02F 1/1335
(52) U.S. Cl. ........................ 349/113; 349/139; 349/143
(58) Field of Search ............................... 349/113, 139, 349/143

(56) References Cited

U.S. PATENT DOCUMENTS 6,031,592 A * 2/2000 Shibahara .................. 349/113
6,144,430 A * 11/2000 Kuo ........................... 349/113

FOREIGN PATENT DOCUMENTS

| JP | 48-099739 | 11/1973 |
| JP | 06-194656 | 7/1994 |
| JP | 07-234414 | 9/1995 |
| JP | 07-318929 | 12/1995 |
| JP | 08-086912 | 4/1996 |
| JP | 08-292413 | 11/1996 |
| JP | 09-123337 | 5/1997 |
| JP | 09-211476 | 8/1997 |

* cited by examiner

*Primary Examiner*—Robert H. Kim
*Assistant Examiner*—David Chung
(74) *Attorney, Agent, or Firm*—Harness, Dickey & Pierce, P.L.C.

(57) ABSTRACT

When a backlight 15 is turned on in a dark environment, white light emerging from the surface of a light guide plate 15b passes through a polarizer 12 and a retardation film 14, enters the interior of the liquid crystal cell, passes through openings of reflective electrodes 7, and is introduced into a liquid crystal layer 3. The light introduced into the liquid crystal layer 3 passes through a color filter 5, emerges from the liquid crystal cell, and passes through the retardation film 13 and the polarizer 11 towards the exterior. In a lighted environment, the light incident on the polarizer 11 passes through the liquid crystal layer 3, is reflected by the reflective electrode 7, and passes through the polarizer 11 again and is emitted towards the exterior.

17 Claims, 27 Drawing Sheets

| φ (DEG.) | -90 | -80 | -70 | -60 | -50 | -40 | -30 | -20 | -10 | 0 | 10 | 20 | 30 | 40 | 50 | 60 | 70 | 80 | 90 |
|---|---|---|---|---|---|---|---|---|---|---|---|---|---|---|---|---|---|---|---|
| REFLECTIVE DISPLAY BLACK (%) | 8.2 | 7.9 | 6.2 | 5.0 | 4.9 | 4.9 | 4.7 | 4.6 | 4.4 | 4.3 | 4.4 | 4.2 | 4.3 | 4.2 | 4.2 | 4.4 | 5.1 | 6.3 | 7.5 |
| REFLECTIVE DISPLAY WHITE (%) | 41.8 | 43.9 | 48.9 | 50.1 | 50.6 | 50.9 | 51.9 | 52.9 | 53.8 | 54.0 | 53.9 | 55.1 | 57.0 | 58.5 | 54.9 | 50.9 | 48.2 | 46.2 | 43.8 |
| REFLECTIVE DISPLAY CONTRAST | 5.1 | 5.6 | 7.9 | 10.0 | 10.3 | 10.4 | 11.0 | 11.5 | 12.2 | 12.6 | 12.3 | 13.1 | 13.3 | 13.9 | 13.1 | 11.6 | 9.5 | 7.3 | 5.8 |

| | -90 | -80 | -70 | -60 | -50 | -40 | -30 | -20 | -10 | 0 | 10 | 20 | 30 | 40 | 50 | 60 | 70 | 80 | 90 |
|---|---|---|---|---|---|---|---|---|---|---|---|---|---|---|---|---|---|---|---|
| TRANSMISSIVE DISPLAY BLACK (%) | 6.9 | 5.8 | 4.9 | 4.3 | 4.1 | 3.9 | 3.7 | 3.5 | 3.9 | 3.4 | 3.3 | 3.3 | 3.2 | 3.2 | 3.4 | 3.7 | 4.1 | 4.7 | 6.0 |
| TRANSMISSIVE DISPLAY WHITE (%) | 18.4 | 20.4 | 20.9 | 22.0 | 23.4 | 25.0 | 24.2 | 24.8 | 25.1 | 25.0 | 24.9 | 25.6 | 26.6 | 26.8 | 25.6 | 22.9 | 19.9 | 19.3 | 18.2 |
| TRANSMISSIVE DISPLAY CONTRAST | 2.7 | 3.5 | 4.3 | 5.1 | 5.7 | 6.4 | 6.5 | 7.1 | 7.0 | 7.3 | 7.5 | 7.8 | 8.3 | 8.4 | 7.5 | 6.2 | 4.9 | 4.1 | 3.0 |

*Fig. 19*

| ψ(DEG.) | -90 | -80 | -70 | -60 | -50 | -40 | -30 | -20 | -10 | 0 | 10 | 20 | 30 | 40 | 50 | 60 | 70 | 80 | 90 |
|---|---|---|---|---|---|---|---|---|---|---|---|---|---|---|---|---|---|---|---|
| REFLECTIVE DISPLAY BLACK (%) | 9.6 | 8.9 | 8.2 | 7.5 | 6.9 | 6.2 | 5.1 | 4.6 | 4.2 | 4.1 | 4.3 | 4.4 | 4.9 | 5.8 | 6.5 | 7.2 | 8.6 | 9.2 | 10.1 |
| REFLECTIVE DISPLAY WHITE (%) | 44.9 | 45.8 | 47.3 | 48.9 | 50.1 | 50.9 | 51.6 | 53.9 | 54.6 | 55.9 | 54.3 | 52.9 | 51.1 | 50.9 | 49.5 | 47.0 | 46.5 | 44.9 | 45.6 |
| REFLECTIVE DISPLAY CONTRAST | 4.7 | 5.1 | 5.8 | 6.5 | 7.3 | 8.2 | 10.1 | 11.7 | 13.0 | 13.6 | 12.6 | 12.0 | 10.4 | 8.8 | 7.6 | 6.5 | 5.4 | 4.9 | 4.5 |

| | -90 | -80 | -70 | -60 | -50 | -40 | -30 | -20 | -10 | 0 | 10 | 20 | 30 | 40 | 50 | 60 | 70 | 80 | 90 |
|---|---|---|---|---|---|---|---|---|---|---|---|---|---|---|---|---|---|---|---|
| TRANSMISSIVE DISPLAY BLACK (%) | 7.6 | 7.0 | 6.4 | 5.9 | 5.3 | 4.9 | 4.6 | 4.3 | 3.9 | 3.9 | 4.1 | 4.3 | 4.5 | 4.9 | 5.2 | 6.2 | 7.0 | 7.8 | 8.5 |
| TRANSMISSIVE DISPLAY WHITE (%) | 19.8 | 20.0 | 22.0 | 21.5 | 22.9 | 23.9 | 24.3 | 25.0 | 24.9 | 25.9 | 24.1 | 23.9 | 23.6 | 22.5 | 21.9 | 20.5 | 20.7 | 20.1 | 20.2 |
| TRANSMISSIVE DISPLAY CONTRAST | 2.6 | 2.9 | 3.4 | 3.6 | 4.3 | 4.9 | 5.3 | 5.8 | 6.4 | 6.6 | 5.9 | 5.6 | 5.2 | 4.6 | 4.2 | 3.3 | 3.0 | 2.6 | 2.4 |

*Fig. 20*

LIQUID CRYSTAL DEVICE AND ELECTRONIC DEVICE

BACKGROUND OF THE INVENTION

1. Technical Field

The present invention relates to the technical field of liquid crystal devices. In particular, the present invention relates to a structure of a liquid crystal device which can change a display mode between a reflective mode and a transmissive mode, and to an electronic device using the liquid crystal device.

2. Background Art

Reflective liquid crystal devices consuming small amounts of electrical power have been widely used in portable devices and display sections in various apparatuses. Since, however, the display is performed by external light, an image is not visible in dark environments. Thus, some proposed liquid crystal devices use external light in a lighted environment as in general reflective liquid crystal devices, and an internal light source in dark environments so as to maintain a visible state. As disclosed in Japanese Patent Application Laid-Open Nos. 57-049271, 57-049271, and 57-049271, each device has a polarizer, a transflector, and a backlight, in that order, at the outer face, away from the viewer, in a liquid crystal panel. The liquid crystal device performs reflective display using external light reflected by the transflector in a lighted environment, and transmissive display using light from the backlight, which is turned on so as to maintain a visible state, transmitted through the transflector in dark environments.

Another liquid crystal device having improved brightness in a reflective display mode is disclosed in Japanese Patent Application Laid-Open No. 8-292413. The liquid crystal device has a transflector, a polarizer, and a backlight, in that order, at the outer face, away from the viewer, of the liquid crystal panel. The device performs reflective display using external light reflected by the transflector when the environment is light, and transmissive display using light from the backlight, which is turned on so as to maintain a visible state, transmitted through the polarizer and the transflector. Since the polarizer is not provided between the liquid crystal cell and the transflector, brighter display is achieved in a reflective mode compared to the above-mentioned liquid crystal devices.

In the liquid crystal device disclosed in Japanese Patent Application Laid-Open No. 8-292413, however, a transparent substrate is disposed between a liquid crystal layer and the transflector; hence, problems, such as double imaging and blurred imaging, occur.

Color liquid crystal display has been required with recent development of portable devices and office automation devices. Apparatuses using reflective liquid crystal devices also require color display. In a combination of the liquid crystal device disclosed in the above patent application with a color filter, the transflector is arranged behind the liquid crystal panel. Thus, the thick transparent substrate lies between the liquid crystal layer with the color filter and the transflector, resulting in occurrence of double imaging or blurred imaging due to parallax and insufficient coloring.

In order to solve the problems, Japanese Patent Application Laid-Open No. 9-258219 discloses a reflective color liquid crystal device in which a reflector is disposed so as to come into contact with the liquid crystal layer. This liquid crystal device, however, cannot display visible images in dark environments.

In addition, Japanese Patent Application Laid-Open No. 7-318929 discloses a transflective liquid crystal device in which a pixel electrode functioning as a transflective film is provided on the inner face of the liquid crystal cell. Since this liquid crystal device has a transflective film such as a metallic thin film having fine defects including pinholes, dimples, and fine openings, an oblique electric field which is generated on the periphery of the defects and openings causes unsatisfactory orientation of the liquid crystal, producing many technical problems which inhibit high-quality image display. That is, a high contrast and brightness are not achieved, and coloring due to wavelength dispersion of light inevitably occurs both in a reflective display mode and a transmissive display mode. Furthermore, it is difficult to achieve both prevention of brightness defects at the gap between pixel electrodes or an improvement in contrast and an improvement in brightness in a reflective display mode. Furthermore, the production process requires addition of a particular step; hence, the device satisfies with great difficulty a typical demand for reduction in production cost in this technical field.

The present invention has been accomplished in view of the above-mentioned problems and has an object to provide a transflective liquid crystal device, which is changeably used both in a reflective display mode and a transmissive display mode, does not produce double imaging and blurred imaging due to parallax, can display high-quality images, and to provide an electronic apparatus using the liquid crystal device.

SUMMARY OF THE INVENTION

The object of the present invention is achieved by a first liquid crystal device including a pair of first and second transparent substrates; a liquid crystal layer disposed between the first and second substrates; a transparent electrode formed on a face of the first substrate on the side of the liquid crystal layer; a reflective electrode formed on a face of the second substrate and having an oblong slit, the face contacting the liquid crystal layer; and an illumination unit provided on another face of the second substrate on the opposite side of the liquid crystal layer.

In accordance with the first liquid crystal device of the present invention, the reflective electrode reflects external light incident on the first substrate towards the liquid crystal layer in a reflective display mode. Since the reflective electrode is provided on the liquid crystal layer face of the second substrate, no gap is substantially formed between the liquid crystal layer and the reflective electrode and thus double imaging and blurred imaging due to parallax do not occur. In a transmissive display mode, illuminated light incident on the second substrate from the illumination unit enters the liquid crystal layer through the slits. Thus, the illuminated light enables bright display in dark environments.

Since the reflective electrode has oblong slits, an oblique electric field (hereinafter referred to as an "oblique electric field due to the short sides of the slit") is applied to the liquid crystal layer between the edges of each reflective electrode defining short sides of a slit and opposingly disposed at a relatively large distance (edges of each reflective electrode opposing each other at each end of two long sides of a slit) and the transparent electrode. An oblique electric field (hereinafter referred to as an "oblique electric field due to the long sides of the slit") is simultaneously applied to the liquid crystal layer between edges of each reflective electrode defining long sides of a slit and opposingly disposed at a relatively short distance (edges of each reflective electrode opposing each other at each end of two short sides of a slit) and the transparent electrode. The components of the oblique electric field due to the short sides of the slit and the same of the oblique electric field due to the long sides of the slit are perpendicular to each other in the substrate plane. When these two oblique electric fields interact with liquid crystal molecules in the vicinity of the slit, the intensities of these two oblique electric fields determine the direction of movement of liquid crystal molecules. If the slit is a square, these two oblique electric fields are equivalent to each other. Thus, the relationship between these intensities is reversed at some positions. As a result, the directions of movement of liquid crystal molecules are different at these positions, and insufficient alignment of the liquid crystal appears as a relatively large domain. That is, display defects occur in the domain. Insufficient alignment is most noticeable when these two oblique electric fields have the same intensity. If one is higher than the other in a region, movement of liquid crystal molecules in the region is controlled by the oblique electric field having a higher intensity and thus becomes uniform. In the present invention, the oblique electric field (the in-substrate-plane component is parallel to the longitudinal direction of the slit) due to the short sides of the slit is reduced in response to the length of long sides of the slit. In contrast, the oblique electric field (the in-substrate-plane component is perpendicular to the longitudinal direction of the slit) due to the long sides of a slit is relatively increased in response to the length of the short sides of the slit. In the present invention, therefore, the oblique electric field due to the long sides of the slit controls the movement of liquid crystal molecules. Accordingly, insufficient alignment is reduced in the vicinity of the slit and display defects are reduced. Furthermore, electrical power consumed by the liquid crystal device can be reduced by a reduced threshold voltage, since the liquid crystal is partly driven using the oblique electric field due to the long sides of the slit.

When a countermeasure is taken only for the oblique electric field due to the long side of the slit, and no consideration is given to the oblique electric field due to the short side of the slit, overall insufficient alignment of the liquid crystal caused by the oblique electric field can be reduced. Alternatively, voluntary use of the oblique electric field (for example, setting of various operational parameters for reducing adverse effects of insufficient alignment of the liquid crystal caused by the oblique electric field in practice or for satisfactorily driving of the liquid crystal by the oblique electric field, setting of specifications of constituents and parts, and device design) facilitates satisfactory driving of the liquid crystal. If the slit is square, countermeasures must be taken for two oblique electric fields, resulting in very difficult design and production of the liquid crystal device. Furthermore, voluntary use of these two oblique electric fields is almost impossible in practice.

As materials for the reflective electrode, metals containing aluminum as a primary component are used. Metals which can reflect external visible light, such as chromium and silver, can also be used without limitation. Since the reflective electrode has a function of reflecting external light and a function of applying a voltage to the liquid crystal, this device structure has advantages in production and design and facilitates cost reduction compared to a structure having independently formed reflective electrodes and pixel electrodes.

Oblong slits can be readily formed by a photostep using a resist, a development step, and then a peeling step. It means that there is no need to increase the number of production processes since the slits can be simultaneously formed when the reflective electrodes are formed. The width of each slit is in a range of preferably 0.01 $\mu$m to 20 $\mu$m, and is more preferably 1 $\mu$m to 5 $\mu$m. Thus, a reflective display mode and a transmissive display mode can be simultaneously achieved without deterioration of image quality due to provision of the slit, since a viewer cannot recognize such a structure. Preferably, the slit has an area ratio of 5% to 30% with respect to the reflective electrode. Such a ratio can moderate decreased brightness in a reflective display mode, and achieves a transmissive display mode by light incident on the liquid crystal layer via the slits of the reflective electrodes.

The first liquid crystal device can be driven by various conventional driving system, such as a passive matrix driving system, a thin film transistor (TFT) active matrix driving system, a thin film diode (TFD) active matrix driving system, or a segment driving system.

In an embodiment of the first liquid crystal device in accordance with the present invention, the reflective electrode comprises a plurality of stripe electrodes at a predetermined gap and the slit extends in the longitudinal direction of the reflective electrode.

According to this embodiment, a countermeasure for the oblique electric field caused by the long sides of the slit is effective for the oblique electric field caused by gaps between the reflective electrodes. Furthermore, the reflective electrodes and the slits can be simultaneously formed, and the design of the mask used in the formation can be simplified. Thus, this embodiment has advantages in a structure, production, and design of the device.

In this embodiment in which the stripe reflective electrodes are formed in stripe, the transparent electrode may comprise a plurality of stripe electrodes at a predetermined gap in the direction perpendicular to the reflective electrode and the slit may extend to a position facing the gap between the transparent electrodes.

In such a structure, edges of each reflective electrode defining short sides of each slit and opposingly disposed at a relatively large distance lie in a position in which the transparent electrode is not formed. That is, the edges lie distant from a portion of the reflective electrode in which a voltage is applied between the transparent electrode and the reflective electrode. Thus, the effect of the oblique electric field due to the short side of the slit can be significantly reduced.

In this embodiment in which the reflective electrodes are formed in stripe, the slit may extend over a plurality of pixels.

In such a structure, each pixel does not have edges of reflective electrodes defining short sides of slits opposingly disposed at a relatively large distance; hence, the effect of the oblique electric field which is applied to the liquid crystal layer between the edges of the reflective electrode and the transparent electrode due to the short side (a shorter side is preferable) of the slit can be significantly reduced.

In this case, the slit may extend to the exterior of the image display region.

In such a structure, each pixel does not have edges of reflective electrodes defining short sides of slits opposingly disposed at a relatively large distance; hence, the effect of the oblique electric field due to the short side (a shorter side is preferable) of the slit can be almost completely reduced.

In this embodiment in which electrodes are formed in stripe, the width of a slit may be substantially equal to a gap between reflective electrodes.

In such a structure, a countermeasure for or voluntary use of, the oblique electric field due to the long side of the slit is also effective as a countermeasure for or voluntary use of, the oblique electric field due to the gap between the reflective electrodes. Furthermore, the slits can be simultaneously formed when the reflective electrodes are formed and design of the photomask is simplified; hence this structure has significant advantages in production and design of the device. Herein "substantially equal" means that the width of a slit is almost equal to the gap between the reflective electrodes so that the effect of the oblique electric field due to the long side of the slit and the effect of the oblique electric field caused by the gap between the reflective electrodes appear equally, or almost equal enough that they can be formed utilizing photomasks having the same width.

In another embodiment of the first liquid crystal device in accordance with the present invention, the width of the slit is 4 μm or less.

As a result of experiments and research by the present inventors, the variation of the threshold voltage of the liquid crystal with the width of the slit was elucidated. Specifically, when the slit width is larger than 4 μm, the threshold voltage of the liquid crystal significantly differs between the reflective display mode and the transmissive display mode; hence, it is difficult or impossible to set a driving voltage enabling a satisfactory contrast and a variation of density in both display modes. When the width of the slit is larger than 4 μm, a high intensity electric field would likely be necessary to drive the liquid crystal facing the slit. Since the width of the slit is 4 μm or less in this embodiment, the threshold voltage of the liquid crystal can be set to be substantially the same in both the reflective display mode and the transmissive display mode. For example, when the width of the slit is 2 μm and the width of the reflective electrode is 10 μm, a driving voltage facilitating a high contrast and a large change in density can be readily set.

In another embodiment of the first liquid crystal device in accordance with the present invention, an angle ξ between the alignment direction of the liquid crystal molecule substantially in the center between the transparent electrode and the reflective electrode and the longitudinal direction of the slit is in a range of $-60° \leq \xi \leq 60°$.

According to this embodiment, the angle between the alignment direction of liquid crystal molecules, which lie substantially in the center between the transparent electrode and the reflective electrode and have the highest mobility, and the longitudinal direction of the slit shifts by 30° or more from a right angle. Thus, when a voltage is applied between the transparent electrode and the reflective electrode, the alignment state of the liquid crystal molecules changes satisfactorily with almost no formation of a tilt domain. Thus, the threshold voltage during driving of the liquid crystal can be reduced, resulting in reduced power consumption of the liquid crystal device. Furthermore, display defects, such as disclination due to the tilt domain in the liquid crystal layer, are avoidable. A significant tilt domain is generated if the angle ξ is outside the range of $-60° \leq \xi \leq 60°$, because the alignment direction of the liquid crystal molecules is perpendicular to the longitudinal direction of the slit. Thus, the driving voltage increases. The above advantage is particularly noticeable in a range of $-30° \leq \xi 30°$. The tilt domain is the same as the phenomenon described in "Liquid Crystal Device Handbook", p. 254, edited by Committee 142 in Japan Society for the Promotion of Science, and published by The Daily Industrial News. The tilt domain in the present invention, however, is generated by the direction of the applied voltage, not by the pretilt angle.

In another embodiment of the first liquid crystal device of the present invention, an angle δ between the alignment direction of a liquid crystal molecule in the vicinity of the reflective electrode and the longitudinal direction of the slit is in a range of $-30° \leq \delta \leq 30°$.

According to this embodiment, the alignment direction of the liquid crystal molecule in the vicinity of the reflective electrode having a predetermined pretilt angle is nearly parallel to, rather than perpendicular to, the longitudinal direction of the slit. Thus, there is substantially no possibility of the liquid crystal molecule at the substrate interface being reverse-tilted by the effect of the oblique electric field. Display defects such as disclination due to the reverse tilt domain are, therefore, avoidable. Thus, the threshold voltage during driving of the liquid crystal can be reduced, resulting in reduced power consumption of the liquid crystal device. If the angle δ is in a range outside $-30° \leq \delta \leq 30°$, the liquid crystal molecule at the substrate interface is noticeably reverse-titled by the effect of the oblique electric field causing display defects. Furthermore, the driving voltage increases, resulting in increased power consumption. The above advantage is particularly noticeable in a range of $-10° \leq \delta \leq 10°$.

In another embodiment of the first liquid crystal device in accordance with the present invention, the device is in a dim or black state when not driven.

Since the device is in a dim or black state when not driven in this embodiment, optical leakage from boundaries between non-driven liquid crystal pixels or dots can be reduced in a transmissive display mode, resulting in transmissive display having a high contrast. Furthermore, undesirable reflection at boundaries between pixels or dots can be reduced in a reflective display mode, resulting in a display having a high contrast.

In another embodiment of the first liquid crystal device in accordance with the present invention, a shading layer is formed on at least one of the face of the first substrate on the side of the liquid crystal layer and the face of the second substrate on the side of the liquid crystal layer, so as to at least partly cover the gap between the reflective electrodes.

According to this embodiment, optical leakage from boundaries between non-driven liquid crystal pixels or dots can be reduced in a transmissive display mode, resulting in transmissive display having a high contrast. Furthermore, undesirable reflection at boundaries between pixels or dots can be reduced in a reflective display mode, resulting in a display having a high contrast.

In another embodiment of the first liquid crystal device in accordance with the present invention, the device further includes a first polarizer provided on another face of the first substrate on the opposite side of the liquid crystal layer, and at least one first retardation film disposed between the first substrate and the first polarizer.

According to this embodiment, the first polarizer primarily achieves satisfactory display control in both the reflective and transmissive display modes, and the first retardation film primarily reduces effects on tonality, such as coloring, due to the wavelength dispersion of light.

In another embodiment of the first liquid crystal device in accordance with the present invention, the device further includes a second polarizer disposed between the second substrate and the illumination unit, and at least a second retardation film disposed between the second substrate and the second polarizer.

According to this embodiment, the second polarizer primarily achieves satisfactory display control in the transmissive display mode, and the second retardation film primarily reduces effects on tonality, such as coloring, due to the wavelength dispersion of light.

In another embodiment of the first liquid crystal device in accordance with the present invention, the reflective electrode contains 95% by weight or more of aluminum and has a thickness of 10 nm to 40 nm.

According to this embodiment, a thin transflective type reflective electrode is formed. According to experiments, the transflective reflective electrode has a transmittance of 1% to 40% and a reflectance 50% to 95% within the above thickness range.

In another embodiment of the first liquid crystal device in accordance with the present invention, the device further includes a color filter provided between the reflective electrode and the first substrate.

According to this embodiment, reflective color display by external light and transmissive color display using an illumination unit are available. Preferably, the color filter has a transmittance of 25% or more for light of any wavelength within a range of 380 nm to 780 nm. Bright reflective and transmissive color display is thereby achieved.

In another embodiment of the first liquid crystal device in accordance with the present invention, the device further includes a diffuser on another face of the first substrate on the opposite side of the liquid crystal layer.

According to this embodiment, the diffuser makes the mirror face of the reflective electrode look as a diffusing face (white surface). Diffusion by the diffuser enables display with a wide view angle. The diffuser may be disposed at any position above the face of the first substrate on the opposite side of the liquid crystal layer. Preferably, the diffuser is disposed between the polarizer and the first substrate in consideration of the effect of back scattering (scattering of the external light towards the incident side of it). The back scattering not contributing to the display of the liquid crystal device causes a decreased contrast in a reflective display mode. When the diffuser is disposed between the polarizer and the first substrate, the polarizer can reduce the quantity of light of back scattering to approximately one-half.

In another embodiment of the first liquid crystal device in accordance with the present invention, the reflective electrode has irregularities.

According to this embodiment, the irregularities eliminate the mirroring on the face of the reflective electrode and make the mirror face look as a diffusing face (white face). Diffusion by the irregularities enables display with a wide view angle. The irregularities may be formed by forming a photosensitive acrylic resin layer under the reflective electrode, or by roughening the underlying glass substrate with aqueous hydrogen fluoride. It is preferable in order to achieve satisfactory alignment of the liquid crystals that a transparent planarization film be formed on the irregular surface of the reflective electrode so that the surface contacting the liquid crystal layer (the surface on which an alignment film is formed) is planarized.

In another embodiment of the first liquid crystal device in accordance with the present invention, the reflective electrode is a composite of a reflective layer and a transparent electrode layer.

According to this embodiment, even if the reflective electrode with slits is not composed of a reflective and conductive single film, the reflective electrode can be obtained by making the reflective layer reflect external light, and the transparent electrode layer apply a driving voltage to the liquid crystal.

The above-mentioned object of the present invention is also achieved by a first electronic apparatus provided with the first liquid crystal device.

The first electronic apparatus in accordance with the present invention uses a transflective liquid crystal device or a color transflective liquid crystal device without double imaging and blurred imaging due to parallax, and can change a display mode between a reflective mode and a transmissive mode. Thus, the electronic apparatus can display high-quality images in any lighted or dark environment regardless of the level of ambient or external light.

The object of the present invention is also achieved by a second liquid crystal device including a pair of first and second transparent substrates; a liquid crystal layer disposed between the first and second substrates; a transparent electrode formed on a face of the liquid crystal layer side of the first substrate; a reflective electrode formed on a face of the liquid crystal layer side of the second substrate; an illumination unit provided on another face of the second substrate on the opposite side of the liquid crystal layer; a first polarizer provided on another side of the first substrate on the opposite side of the liquid crystal layer; at least one first retardation film disposed between the first substrate and the first polarizer; a second polarizer disposed between the second substrate and the illumination unit; and at least a second retardation film disposed between the second substrate and the second polarizer.

According to the second liquid crystal device of the present invention, the reflective electrode reflects external light incident on the first substrate towards the liquid crystal layer in a reflective display mode. Since the reflective electrode is provided on the face of the second substrate on the side of the liquid crystal layer, no gap is substantially formed between the liquid crystal layer and the reflective electrode. Thus, double imaging and blurred imaging due to parallax do not occur. On the other hand, the reflective electrode comprising a transflective layer transmits light which emerges from the illumination unit and is incident on the second substrate towards the liquid crystal layer in a transmissive display mode. Thus, light from the light source achieves bright display in a dark environment. The transflective layer may be a reflective film having oblong slits or square fine openings so that light partly passes through the film, as in the above-mentioned first liquid crystal of the present invention, a thin metal transflective film having fine defects, such as pinhole defects or dimples, or a film which shows overall transflective characteristics. Alternatively, the layer may be composed of a plurality of stripes or island reflective electrodes formed with a predetermined gap.

Since the second liquid crystal device has the first polarizer, the first retardation film, the second polarizer, and the second retardation film, the first and the second polarizers satisfactorily control display in both the reflective and transmissive display modes. The first retardation film reduces effects on tonality, such as coloring, due to the wavelength dispersion of light in a reflective display mode, whereas the second retardation film reduces effects on tonality, such as coloring, due to the wavelength dispersion of light in a transmissive display mode. The second liquid crystal device can be driven by various conventional driving system, such as a passive matrix driving system, a TFT active matrix driving system, a TFD active matrix driving system, or a segment driving system.

In an embodiment of the second liquid crystal device of the present invention, the device is in a dim or black state when not driven.

Since the device is in a dim or black state when not driven in this embodiment, optical leakage from boundaries between non-driven liquid crystal pixels or dots can be reduced in a transmissive display mode, resulting in transmissive display having a high contrast. Furthermore, undesirable reflection at boundaries between pixels or dots can be reduced in a reflective display mode, resulting in a display having a high contrast.

In another embodiment of the second liquid crystal device in accordance with the present invention, a shading layer is formed on at least one of the face of the first substrate on the side of the liquid crystal layer and the face of the second substrate on the side of the liquid crystal layer so as to at least partly cover the gap between the reflective electrodes.

According to this embodiment, optical leakage from boundaries between non-driven liquid crystal pixels or dots can be reduced in a transmissive display mode, resulting in transmissive display having a high contrast. Furthermore, undesirable reflection, which does not contribute to the display, at boundaries between pixels or dots can be reduced in a reflective display mode, resulting in a display having a high contrast.

In another embodiment of the second liquid crystal device in accordance with the present invention, the reflective electrode contains 95% by weight or more of aluminum and has a thickness of 10 nm to 40 nm.

According to this embodiment, a thin transflective type reflective electrode is formed. According to experiments, the transflective type reflective electrode has a transmittance of 1% to 40% and a reflectance 50% to 95% within the above thickness range.

In another embodiment of the second liquid crystal device in accordance with the present invention, the device further includes a color filter provided between the reflective electrode and the first substrate.

According to this embodiment, reflective color display by external light and transmissive color display using an illumination unit are available. Preferably, the color filter has a transmittance of 25% or more for light of any wavelength within a range of 380 nm to 780 nm. Bright reflective and transmissive color displays are thereby achieved.

In another embodiment of the second liquid crystal device in accordance with the present invention, the device further includes a diffuser on another face of the first substrate on the opposite side of the liquid crystal layer.

According to this embodiment, the diffuser makes the mirror face of the reflective electrode look as a diffusing face (white surface). Diffusion by the diffuser enables display with a wide view angle. The diffuser may be disposed at any position above the face of the first substrate on the opposite side of the Liquid crystal layer. Preferably, the diffuser is disposed between the polarizer and the first substrate in consideration of the effect of back scattering (scattering of the external light towards the incident side of it). The back scattering not contributing to the display of the liquid crystal device causes a decreased contrast in a reflective display mode. When the diffuser is disposed between the polarizer and the first substrate, the polarizer can reduce the quantity of light of back scattering to approximately one-half.

In another embodiment of the second liquid crystal device in accordance with the present invention, the reflective electrode has irregularities.

According to this embodiment, the irregularities eliminate the mirroring on the face of the reflective electrode and render the mirror face into a diffusing face (white face). Diffusion by the irregularities enables display with a wide view angle. The irregularities may be formed by forming a photosensitive acrylic resin layer under the reflective electrode, or by roughening the underlying glass substrate with aqueous hydrogen fluoride. It is preferable in order to achieve satisfactory alignment of the liquid crystals that a transparent planarization film be formed on the irregular surface of the reflective electrode so that the surface facing to the liquid crystal layer (the surface on which an alignment film is formed) is planarized.

In another embodiment of the second liquid crystal device in accordance with the present invention, the reflective electrode is a composite of a reflective layer and a transparent electrode layer.

According to this embodiment, the reflective layer reflects external light, and the transparent electrode layer applies a driving voltage to the liquid crystal even if the reflective electrode is not composed of a reflective and conductive single film.

The above-mentioned object of the present invention is also achieved by a second electronic apparatus provided with the second liquid crystal device.

The second electronic apparatus in accordance with the present invention uses a transflective liquid crystal device or a color transflective liquid crystal device without double imaging and blurred imaging due to parallax, and can change a display mode between a reflective mode and a transmissive mode. Thus, the electronic apparatus can display high-quality images in any lighted or dark environment regardless of the level of ambient or external light.

The object of the present invention is also achieved by a third liquid crystal device including a pair of first and second transparent substrates; a liquid crystal layer disposed between the first and second substrates; a plurality of reflective electrodes with a predetermined gap formed on a face of the second substrate on the side of the liquid crystal layer; a transparent electrode formed on a face of the first substrate on the side of the liquid crystal layer, and opposing to the reflective electrodes and gaps between the reflective electrodes; and an illumination unit provided on an another face of the second substrate on the opposite side of the liquid crystal layer.

According to the third liquid crystal device of the present invention, the reflective electrode reflects external light incident on the first substrate towards the liquid crystal layer in a reflective display mode. Since the reflective electrode is provided on the face of the second substrate on the side of the liquid crystal layer, no gap is substantially formed between the liquid crystal layer and the reflective electrode. Thus, double imaging and blurred imaging due to parallax do not occur. On the other hand, light which is incident on the second substrate passes through a gap between the reflective electrodes and is incident on the liquid crystal layer in a transmissive display mode. Herein, an oblique electric field generated between a portion of the transparent electrode facing the gap between the reflective electrodes, and the reflective electrode can drive the liquid crystal. Thus, light from the light source which passes through the gap between the reflective electrodes is driven by the oblique electric field to facilitate bright display. Whitening by non-driven liquid crystal portions facing the gap between the reflective electrodes can be simultaneously prevented, and thus display defects due to the gap between the reflective electrodes can be reduced. Since covering the gap between the reflective electrodes with a shading film (called a "black matrix" or a "black mask") is not necessary, this structure has advantages in production and design of the device.

The third liquid crystal device can be driven by various conventional driving system, such as a passive matrix driving system, a TFT active matrix driving system, a TFD active matrix driving system, or a segment driving system. Thus, the reflective electrodes may be composed of a plurality of stripe electrodes or a plurality of rectangular electrodes depending on the applied driving system.

The width of the gap between the reflective electrodes is in a range of preferably 0.01 μm to 20 μm, and is more preferably 1 μm to 5 μm. A reflective display mode and a transmissive display mode can be simultaneously achieved without deterioration of image quality due to provision of the gap, since a viewer cannot recognize such a structure. Preferably, the gap has an area ratio of 5% to 30% with respect to the reflective electrode. Such a ratio can moderate decreased brightness in a reflective display mode, and achieves a transmissive display mode by light incident on the liquid crystal layer via the gap between the reflective electrodes. In the transmissive display mode, bright high-quality display by the liquid crystal at the gap portion is achieved by increasing luminance of the light source in the illumination unit, even if only a small portion of the overall liquid crystal is driven by the oblique electric field.

In an embodiment of the third liquid crystal in accordance with the present invention, a plurality of long reflective electrodes is formed, and an angle $\phi$ between the alignment direction of liquid crystal molecules, which lie substantially in the center between the transparent electrode and the reflective electrodes, and the longitudinal direction of the reflective electrodes is in a range of $-60° \leq \phi \leq 60°$.

According to this embodiment, long reflective electrodes, such as stripe- or rectangular-reflective electrodes, are formed, and the angle between the alignment direction of liquid crystal molecules, which lie substantially in the center between the transparent electrode and the reflective electrode and have the highest mobility, and the longitudinal direction of the reflective electrode shifts by 30° or more from a right angle. When a voltage is applied between the transparent electrode and the reflective electrode, the alignment state of the liquid crystal molecules changes satisfactorily without formation of a tilt domain. Thus, the threshold voltage during driving of the liquid crystal can be reduced, resulting in reduced power consumption of the liquid crystal device. Furthermore, display defects, such as disclination, due to the tilt domain in the liquid crystal layer, are avoidable. A significant tilt domain is generated if the angle $\phi$ is outside the range of $-60° \leq \phi \leq 60°$, because the alignment direction of the liquid crystal molecules is perpendicular to the longitudinal direction of the reflective electrode. Thus, the driving voltage increases. The above advantage is particularly noticeable in a range of $-30° \leq \phi \leq 30°$.

In another embodiment of the third liquid crystal device of the present invention, an angle $\psi$ between the alignment direction of a liquid crystal molecule in the vicinity of the reflective electrode and the longitudinal direction of the reflective electrode is in a range of $-30° \leq \psi \leq 30°$.

According to this embodiment, the alignment direction of the liquid crystal molecule in the vicinity of the reflective electrode having a predetermined pretilt angle is nearly parallel to, rather than perpendicular to, the longitudinal direction of the reflective electrode. Thus, there is substantially no possibility of the liquid crystal molecule at the substrate interface being reverse-tilted by the effect of the oblique electric field. Display defects such as disclination due to the reverse tilt domain are, therefore, avoidable. Thus, the threshold voltage during driving of the liquid crystal can be reduced, resulting in reduced power consumption of the liquid crystal device. If the angle $\psi$ is in a range outside $-30° \leq \psi \leq 30°$, the liquid crystal molecule at the substrate interface is noticeably reverse-titled by the effect of the oblique electric field to cause display defects. Furthermore, the driving voltage increases, resulting in increased power consumption. The above advantage is particularly noticeable in a range of $-10° \leq \psi \leq 10°$.

In another embodiment of the third liquid crystal device in accordance with the present invention, the device further includes a first polarizer provided on another face of the first substrate on the opposite side of the liquid crystal layer, and at least one first retardation film disposed between the first substrate and the first polarizer.

According to this embodiment, the first polarizer primarily achieves satisfactory display control in both the reflective and transmissive display modes, and the first retardation film primarily reduces effects on tonality, such as coloring, due to the wavelength dispersion of light.

In another embodiment of the third liquid crystal device in accordance with the present invention, the device further includes a second polarizer disposed between the second substrate and the illumination unit, and at least a second retardation film disposed between the second substrate and the second polarizer.

According to this embodiment, the second polarizer primarily achieves satisfactory display control in the transmissive display mode, and the second retardation film primarily reduces effects on tonality, such as coloring, due to the wavelength dispersion of light.

In another embodiment of the third liquid crystal device in accordance with the present invention, the reflective electrode contains 95% by weight or more of aluminum and has a thickness of 10 nm to 40 nm.

According to this embodiment, a thin transflective type reflective electrode is formed. According to experiments, the transflective type reflective electrode has a transmittance of 1% to 40% and a reflectance 50% to 95% within the above thickness range.

In another embodiment of the third liquid crystal device in accordance with the present invention, the device further includes a color filter provided between the reflective electrode and the first substrate.

According to this embodiment, reflective color display by external light and transmissive color display using an illumination unit are available. Preferably, the color filter has a transmittance of 25% or more for light of any wavelength within a range of 380 nm to 780 nm. Bright reflective and transmissive color displays are thereby achieved.

In another embodiment of the third liquid crystal device in accordance with the present invention, the device further includes a diffuser on another face of the first substrate on the opposite side of the liquid crystal layer.

According to this embodiment, the diffuser makes the mirror face of the reflective electrode look as a diffusing face (white surface). Diffusion by the diffuser enables display from a wide view angle. The diffuser may be disposed at any position above the face of the first substrate on the opposite side of the liquid crystal layer. Preferably, the diffuser is disposed between the polarizer and the first substrate in consideration of the effect of back scattering (scattering of external light towards the incident side of it). The back scattering not contributing to the display of the liquid crystal device causes a decreased contrast in a reflective display mode. When the diffuser is disposed between the polarizer and the first substrate, the polarizer can reduce the quantity of light of back scattering to approximately one-half.

In another embodiment of the third liquid crystal device in accordance with the present invention, the reflective electrode has irregularities.

According to this embodiment, the irregularities eliminate the mirroring on the face of the reflective electrode and render the mirror face into a diffusing face (white face). Diffusion by the irregularities enables display with a wide view angle. The irregularities may be formed by forming a photosensitive acrylic resin layer under the reflective electrode, or by roughening the underlying glass substrate with aqueous hydrogen fluoride. It is preferable in order to achieve satisfactory alignment of the liquid crystals that a transparent planarization film be formed on the irregular surface of the reflective electrode so that the surface facing the liquid crystal layer (the surface on which an alignment film is formed) is planarized.

In another embodiment of the third liquid crystal device in accordance with the present invention, the reflective electrode is a composite of a reflective layer and a transparent electrode layer.

According to this embodiment, the reflective layer of the transflective electrode reflects external light, and the transparent electrode layer applies a driving voltage to the liquid crystal even if the reflective electrode is not composed of a reflective and conductive single film.

The above-mentioned object of the present invention is also achieved by a third electronic apparatus provided with the third liquid crystal device.

The third electronic apparatus in accordance with the present invention uses a transflective liquid crystal device or a color transflective liquid crystal device without double imaging and blurred imaging due to parallax, and can change a display mode between a reflective mode and a transmissive mode. Thus, the electronic apparatus can display high-quality images in any lighted or dark environment regardless of the level of ambient or external light.

The object of the present invention is also achieved by a fourth liquid crystal device including (i) a transflective liquid crystal panel comprising a pair of first and second transparent substrates; a liquid crystal layer disposed between the first and second substrates; a transparent electrode formed on a face of the first substrate facing the liquid crystal layer; a reflective electrode formed on a face of the second substrate facing the liquid crystal layer; and an illumination unit provided on an another face of the second substrate on the opposite side of the liquid crystal layer; and (ii) a driving means for driving the transparent electrode and the reflective electrode; wherein the liquid crystal panel is in a dim or black state when not driven.

According to the fourth liquid crystal device of the present invention, the reflective electrode reflects external light incident on the first substrate towards the liquid crystal layer in a reflective display mode. Since the reflective electrode is provided on the face of the second substrate facing the liquid crystal layer, no gap is substantially formed between the liquid crystal layer and the reflective electrode. Thus, double imaging and blurred imaging due to parallax do not occur. On the other hand, the reflective electrode comprising a transflective layer transmits light which emerges from the illumination unit and is incident on the second substrate towards the liquid crystal layer in a transmissive display mode. Thus, light from the light source achieves bright display in a dark environment. The transflective layer may be a reflective film having oblong slits or square fine openings so that light partly passes through the film, as in the above-mentioned first liquid crystal of the present invention, a thin metal transflective film having fine defects, such as pinhole defects or dimples, or a film which shows overall transflective characteristics. Alternatively, the layer may be composed of a plurality of stripes or island reflective electrodes formed with a predetermined gap. In the fourth liquid crystal device, the-liquid crystal panel driven between the transparent electrode and the reflective electrode by a driving means is a dim state when not driven. That is, it is driven by a normally black mode. Thus, optical leakage from boundaries between non-driven liquid crystal pixels or dots can be reduced in a transmissive display mode, resulting in transmissive display having a high contrast. Furthermore, undesirable reflection at boundaries between pixels or dots can be reduced in a reflective display mode, resulting in a display having a high contrast. Accordingly, an improved contrast is achieved in both a transmissive display mode and a reflective display mode without covering the gap between the reflective electrodes with a shading film (called a "black matrix" or a "black mask"). Since no shading film is provided, brightness does not decrease in a reflective display mode.

The fourth liquid crystal device can be driven by various conventional driving system, such as a passive matrix driving system, a TFT active matrix driving system, a TFD active matrix driving system, or a segment driving system.

In another embodiment of the fourth liquid crystal device in accordance with the present invention, the device further includes a first polarizer provided on another face of the first substrate on the opposite side of the liquid crystal layer, and at least one first retardation film disposed between the first substrate and the first polarizer.

According to this embodiment, the first polarizer primarily achieves satisfactory display control in both the reflective and transmissive display modes, and the first retardation film primarily reduces effects on tonality, such as coloring, due to the wavelength dispersion of light.

In another embodiment of the fourth liquid crystal device in accordance with the present invention, the device further includes a second polarizer disposed between the second substrate and the illumination unit, and at least a second retardation film disposed between the second substrate and the second polarizer.

According to this embodiment, the second polarizer primarily achieves satisfactory display control in the transmissive display mode, and the second retardation film primarily reduces effects on tonality, such as coloring, due to the wavelength dispersion of light.

In another embodiment of the fourth liquid crystal device in accordance with the present invention, the reflective electrode contains 95% by weight or more of aluminum and has a thickness of 10 nm to 40 nm.

According to this embodiment, a thin transflective type reflective electrode is formed. According to experiments, the transflective type reflective electrode has a transmittance of 1% to 40% and a reflectance 50% to 95% within the above thickness range.

In another embodiment of the fourth liquid crystal device in accordance with the present invention, the device further includes a color filter provided between the reflective electrode and the first substrate.

According to this embodiment, reflective color display by external light and transmissive color display using an illumination unit are available. Preferably, the color filter has a transmittance of 25% or more for light of any wavelength within a range of 380 nm to 780 nm. Bright reflective and transmissive color display is thereby achieved.

In another embodiment of the fourth liquid crystal device in accordance with the present invention, the device further includes a diffuser on another face of the first substrate on the opposite side of the liquid crystal layer.

According to this embodiment, the diffuser makes the mirror face of the reflective electrode a diffusing face (white surface). Diffusion by the diffuser enables display with a wide view angle. The diffuser may be disposed at any position above the face of the first substrate on the opposite side of the liquid crystal layer. Preferably, the diffuser is disposed between the polarizer and the first substrate in consideration of the effect of back scattering (scattering of external light towards the incident side of it). The back scattering not contributing to the display of the liquid crystal device causes a decreased contrast in a reflective display mode. When it is disposed between the polarizer and the first substrate, the polarizer can reduce the quantity of light of back scattering to approximately one-half.

In another embodiment of the fourth liquid crystal device in accordance with the present invention, the reflective electrode has irregularities.

According to this embodiment, the irregularities eliminate the mirroring on the face of the reflective electrode and render the mirror face into a diffusing face (white face). Diffusion by the irregularities enables display with a wide view angle. The irregularities may be formed by forming a photosensitive acrylic resin layer under the reflective electrode, or by roughening the underlying glass substrate with aqueous hydrogen fluoride. It is preferable in order to achieve satisfactory alignment of the liquid crystals that a transparent planarization film be formed on the irregular surface of the reflective electrode so that the surface facing to the liquid crystal layer (the surface on which an alignment film is formed) is planarized.

In another embodiment of the fourth liquid crystal device in accordance with the present invention, the reflective electrode is a composite of a reflective layer and a transparent electrode layer.

According to this embodiment, the reflective layer of the transflective electrode reflects external light, and the transparent electrode layer applies a driving voltage to the liquid crystal even if the reflective electrode is not composed of a reflective and conductive single film.

The above-mentioned object of the present invention is also achieved by a fourth electronic apparatus provided with the fourth liquid crystal device.

The fourth electronic apparatus in accordance with the present invention uses a transflective liquid crystal device or a color transflective liquid crystal device without double imaging and blurred imaging due to parallax, and can change a display mode between a reflective mode and a transmissive mode. Thus, the electronic apparatus can display high-quality images in any lighted or dark environment regardless of the level of ambient or external light.

BRIEF DESCRIPTION OF THE DRAWINGS

FIG. 19 is a table showing contrasts in a reflective display mode and a transmissive display mode when the angle φ is varied in a ninth embodiment in accordance with the present invention.

FIG. 20 is a table showing contrasts in a reflective display mode and a transmissive display mode when the angle ψ is varied in the ninth embodiment.

FIG. 21b is a cross-sectional view taken along line B–B' in FIG. 21a.

BEST MODE FOR CARRYING OUT THE INVENTION

A best mode in each embodiment for carrying out the present invention will now be described with reference to the drawings.

Figure 1A:
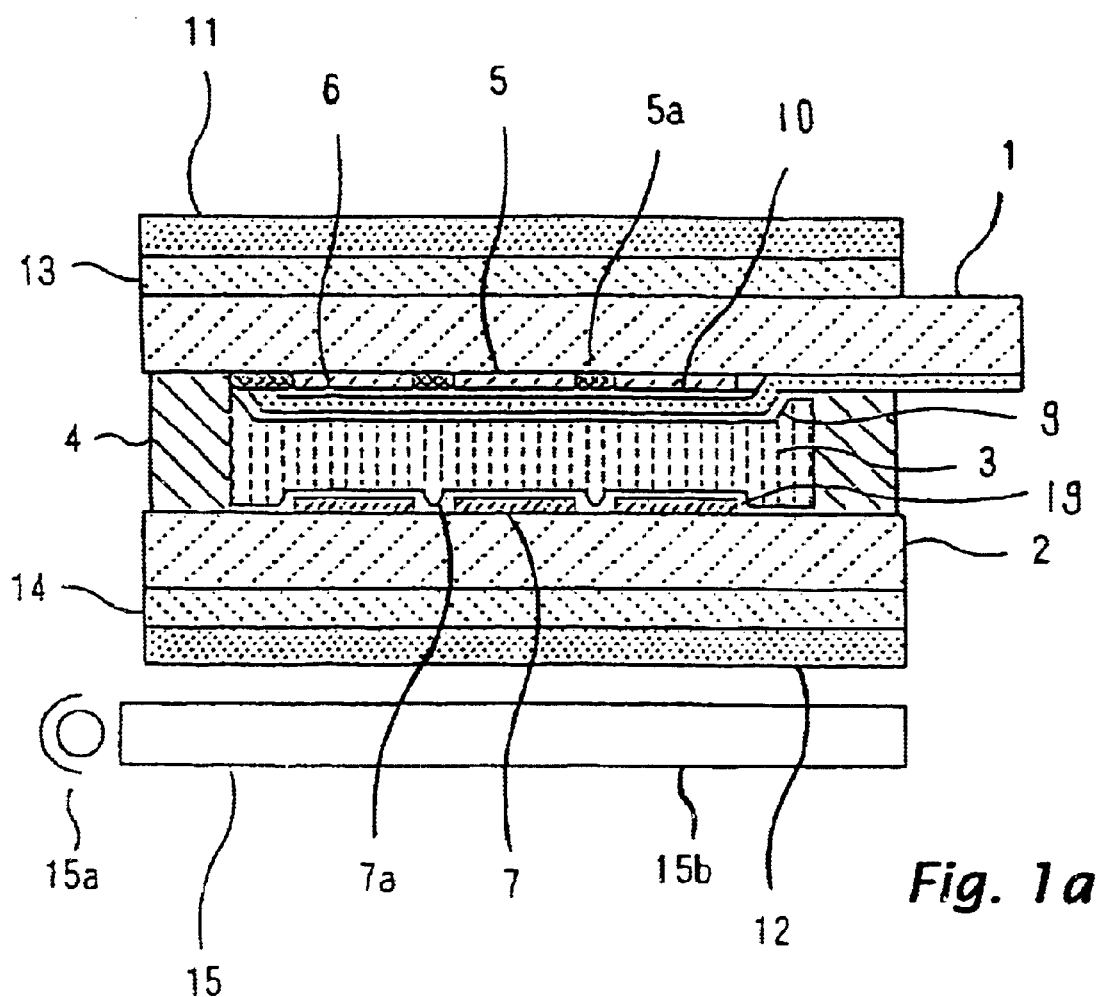
FIG. 1a is a longitudinal cross-sectional view of an outline structure in a first embodiment and a second embodiment of a liquid crystal device in accordance with the present invention.
Figure 1B:
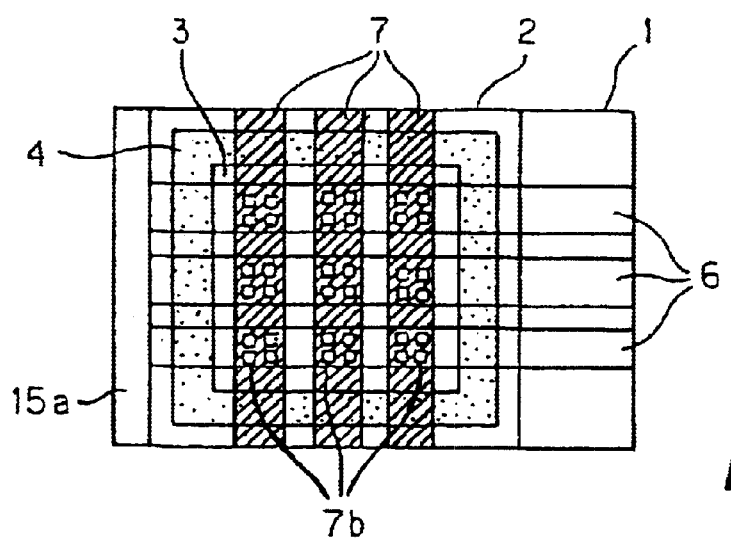
FIG. 1b is a plan view of an outline structure in the first embodiment and the second embodiment.

A first embodiment of a liquid crystal device in accordance with the present invention will be described with reference to FIGS. 1a and 1b. FIG. 1a is a longitudinal cross-sectional view of an outline structure in the first embodiment of the present invention. FIG. 1b is an outline plan view of the first embodiment shown in FIG. 1a. In FIG. 1b, a color filter and a black matrix layer shown in FIG. 1a are omitted so that the electrode arrangement is readily visible, and only three vertical and three horizontal stripe electrodes are depicted, although many stripe electrodes are provided in an actual liquid crystal device. Although the first embodiment fundamentally relates to a passive matrix liquid crystal device, it is also applicable to an active matrix device, a segment-type device, and other types of liquid crystal devices.

As shown in FIGS. 1a and 1b, in the first embodiment, a liquid crystal cell is formed in which a liquid crystal layer 3 is disposed between two transparent substrates 1 and 2 and sealed by a sealing frame 4. The liquid crystal layer 3 is composed of a nematic liquid crystal having a predetermined twist angle. A color filter 5 is formed on an inner surface of the front transparent substrate 1, and the color filter 5 is provided with three red (R), green (G), and blue (B) coloring layers which are arranged in a predetermined pattern. The surface of the color filter 5 is covered with a transparent protective film 10, and a plurality of stripe transparent electrodes 6 composed of, for example, indium tin oxide (ITO) is formed on the surface of the protective film 10. An alignment film 9 is formed on the transparent electrodes 6, and is previously subjected to rubbing treatment in a predetermined direction.

A plurality of stripe reflective electrodes 7, which is formed corresponding to coloring layers of the color filter 5, is arranged on the inner face of the rear transparent substrate 2 so as to cross the transparent electrodes 6. In an active matrix device provided with TFD elements and TFT elements, each reflective electrode 7 is rectangular, and is connected to a lead line through an active element. The reflective electrode 7 is composed of chromium or aluminum, and has a reflective surface which reflects light incident on the transparent substrate 1. An alignment film 19 is formed on the reflective electrode 7 as described above. Each reflective electrode 7 has many openings 7b having a diameter of 2 µm (see FIG. 1b), and the openings 7b have a total area corresponding to approximately 10% of the total area of the reflective electrode 7.

A polarizer 11 is disposed above the outer face of the front transparent substrate 1, and a retardation film 13 is disposed between the polarizer 11 and the transparent electrode 1. At the rear side of the liquid crystal cell, a retardation film 14 is provided behind the transparent substrate 2, and a polarizer 12 is provided behind the retardation film 14. A backlight 15 provided with a fluorescent tube 15a emitting white light and a light guide plate 15b having an incident end face along the fluorescent tube 15a is arranged behind the polarizer 12. The light guide plate 15b is composed of a transparent body, such as an acrylic resin plate, having an entire rough surface for scattering or a printed layer for scattering. It receives light from the fluorescent tube 15a as a light source at the end face, and emerges substantially uniform light from the top face in the drawing. Examples of other usable backlights include a light emitting diode (LED) and an electroluminescent (EL) lamp.

In the first embodiment, a black matrix layer 5a as a shading layer is formed between two coloring layers of the color filter 5 in such manner that the black matrix layer 5a is provided substantially corresponding to the region 7a, when viewing from the top, between two reflective electrodes 7, so that the black matrix layer prevents optical leakage from the region 7a in a transmissive display mode. The black matrix layer 5a is formed of a coated chromium layer or a photosensitive black resin layer.

The operation of the first embodiment having the above structure will now be described.

First, a reflective display mode will be described. External light, in FIG. 1, transmitted through the polarizer 11, the retardation film 13, the color filter 5, and then passing through the liquid crystal layer 3, is reflected by each reflective electrode 7, and emerges again from the polarizer 11. The polarizer 11 is controlled to a transmissive state (lighted state), an absorbed state (dim state), or an intermediate brightness state therebetween in response to a voltage applied to the liquid crystal layer 3.

Next, a transmissive display mode will be described. Light from the backlight 15 is converted to a predetermined polarized light beam by the polarizer 12 and the retardation film 14, enters the liquid crystal layer 3 through openings 7b of each reflective electrode 7, passes though the liquid crystal layer 3, and then is transmitted through the color filter 5 and the retardation film 13. Brightness of the polarizer 11 is controlled to a transmissive state (lighted state), an absorbed state (dim state), or an intermediate state therebetween in response to a voltage applied to the liquid crystal layer 3.

This embodiment can provide a color liquid crystal device without double imaging and blurred imaging, and which can change a display mode between a reflective mode and a transmissive mode.

In the first embodiment, the polarizer 11 as a first polarizer, the retardation film 13 as a first retardation film, the polarizer 12 as a second polarizer, and the retardation film 14 as a second retardation film, are provided; hence, the polarizers 11 and 12 can satisfactorily control display in both the reflective display mode and the transmissive display mode. The retardation film 13 moderates effects on tonality such as coloring due to wavelength dispersion of light in the reflective display mode (the retardation film 13 optimizes display in the reflective mode). Also, the retardation film 14 moderates effects on tonality such as coloring due to wavelength dispersion of light in the transmissive display mode (the retardation film 14 optimizes display in the transmissive mode, under the condition of the optimization by the retardation film 13 in the reflective display mode). Although one retardation film is used in this embodiment regarding each of the retardation film 13 and the retardation film 14, a plurality of retardation films may be provided at positions for correcting coloring of the liquid crystal cell and for correcting the view angle. Use of a plurality of retardation films further facilitates optimization of correction of the coloring and the view angle.

The openings 7b provided in each reflective electrode 7 in the first embodiment are composed of square fine openings or oblong slits which are regularly arranged in the plane of the reflective electrode 7, or composed of fine defects, such as pinholes and dimples, dotted in the reflective electrode 7. These openings transmit light. The structure of such openings 7b will be described in subsequent sixth to eighth embodiments in detail with reference to FIGS. 7 to 11, and thus detailed description is omitted in this embodiment.

Transmissive display is performed by light emerging from the backlight 15 through the openings 7b provided in the reflective electrode 7 in the first embodiment. Also, in a structure for performing transmissive display in which light is introduced through openings 7a in the reflective electrode 7 (see the thirteenth embodiment described below), a combination of a polarizer 11 with a retardation film 13 and a combination of a polarizer 12 and a retardation film 14 can provide satisfactory display in a reflective display mode and a transmissive display mode, respectively, and can moderate coloring due to wavelength dispersion of light.

A second embodiment of a liquid crystal device in accordance with the present invention will now be described with reference to FIGS. 1a and 1b. The fundamental structure in the second embodiment is the same as that in the first embodiment. In the second embodiment, materials for and properties of the liquid crystal, the reflective electrode, the alignment film, and the polarizer are specifically limited. Although the second embodiment fundamentally relates to a passive matrix liquid crystal display device, it is also applicable to an active matrix device, a segment-type device, and other types of liquid crystal devices.

With reference to FIGS. 1a and 1b, in the second embodiment, rubbing treatment in a predetermined direction is performed on the alignment film 9 formed on the transparent electrode 6 so that liquid crystal molecules in the liquid crystal layer 3 have pretilted angle of approximately 85 degrees in the rubbing direction. The above-described alignment film 19 is formed on the reflective electrode 7, but is not subjected to rubbing treatment. As the reflective electrode 7, a metal film with a thickness of 25 nm is used in which aluminum containing 1.0 percent by weight of neodymium is sputtered. The aluminum used has a purity of 95 percent by weight, and the thickness is set to be in a range of 10 nm to 40 nm. Such a reflective electrode 7 may also be used in the first embodiment. Quarter-wavelength plates are used as retardation films 13 and 14.

Figure 2A:
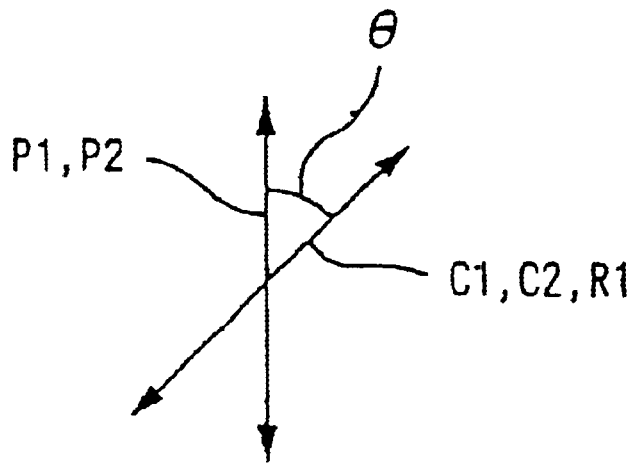
FIG. 2 includes a schematic illustration of the relationship among a polarizer, a retardation film, and a rubbing direction of a liquid crystal cell, and a characteristic graph between the driving voltage and the reflectance R/transmittance T in the liquid crystal device.

In the second embodiment, the polarization axes P1 and P2 of the polarizers 11 and 12 are set in the same direction, as shown in FIG. 2(a). The slow axes C1 and C2 of the retardation films 13 and 14 (the quarter-wavelength plates) are set in the direction rotating clockwise by θ=45 degrees from the polarization axes P1 and P2 of the polarizers 11 and 12, respectively. The rubbing direction R1 of the alignment film 9 on the inner face of the transparent substrate 1 also agrees with the slow axes C1 and C2 of the retardation films 13 and 14 (the quarter-wavelength plates). The rubbing direction R1 determines the tilted direction of the liquid crystal layer 3 when a voltage is applied. A nematic liquid crystal having negative 2 is used as the liquid crystal layer 3.

Figure 2B:
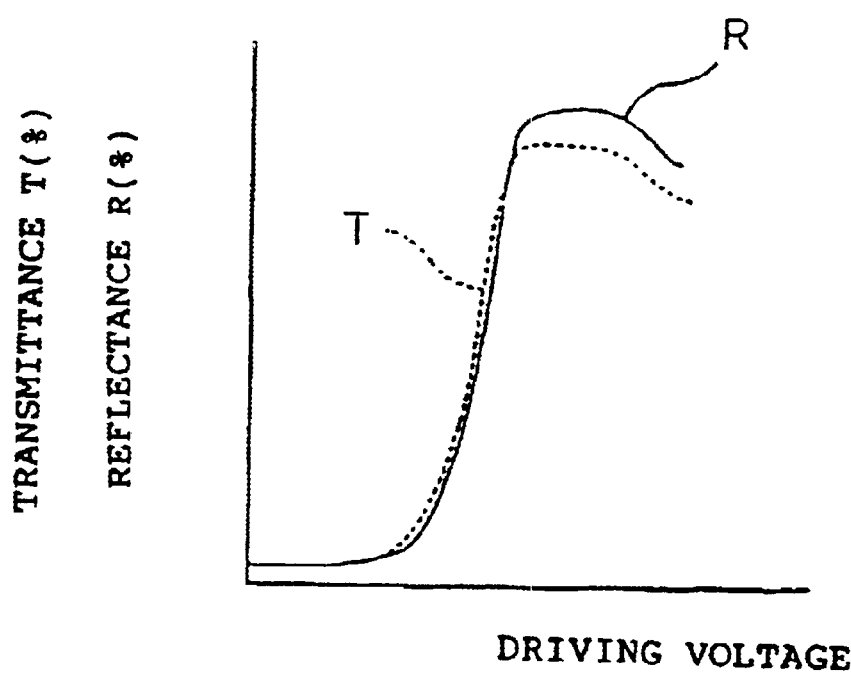

FIG. 2(b) shows a driving voltage versus a reflectance R relationship in a reflective display mode and a driving voltage versus a transmittance T relationship in a transmissive display mode in the second embodiment. The display state when no voltage is applied is dim or black. That is, the liquid crystal device is driven by a normally black mode. Since such a driving mode suppresses optical leakage and unnecessarily reflected light from a gap 7a between reflective electrodes 7 with respect to a non-driven liquid crystal, formation of a black matrix layer 5a is unnecessary.

The operation of the second embodiment having the above structure will now be described.

First, a reflective display mode will be described. External light, in FIG. 1, is transmitted through the polarizer 11, the retardation film 13, and the color filter 5, then passing through the liquid crystal layer 3, and is reflected by each reflective electrode 7, and still further emerges from the polarizer 11. Brightness of the polarizer 11 is controlled to a transmissive state (lighted state), an absorbed state (dim state), or an intermediate state therebetween in response to a voltage applied to the liquid crystal layer 3.

Next, a transmissive display mode will be described. Light from the backlight 15 is converted into a predetermined polarized light beam by the polarizer 12 and the retardation film 14 (circularly polarized light, elliptically polarized light, or linearly polarized light), enters the liquid crystal layer 3 through openings 7b of each reflective electrode 7, and passes though the liquid crystal layer 3, then is transmitted through the color filter 5 and the retardation film 13, respectively. Brightness of the polarizer 11 is controlled to a transmissive state (lighted state), an absorbed state (dim state), or an intermediate state therebetween in response to a voltage applied-to the liquid crystal layer 3.

This embodiment can provide a color liquid crystal device without double imaging and blurred imaging, and which can change a display mode between a reflective mode and a transmissive mode.

Figure 3:
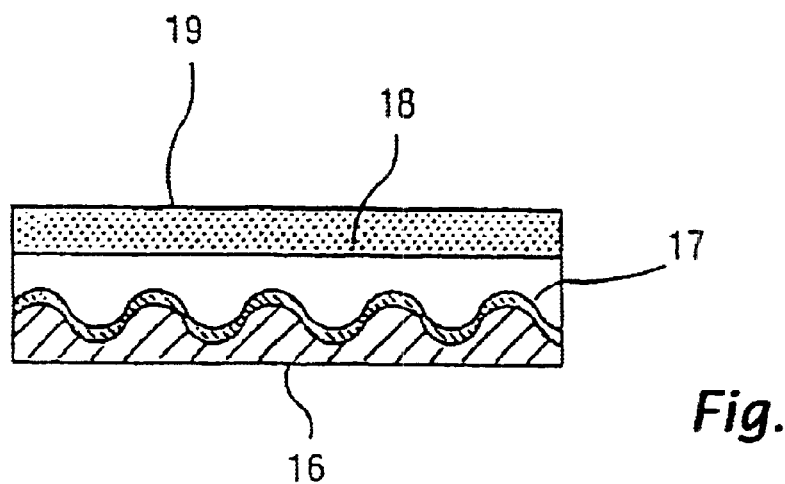
FIG. 3 is an enlarged cross-sectional view of an outline structure of a second transparent substrate in a third embodiment of a liquid crystal device in accordance with the present invention.

A third embodiment of a liquid crystal device in accordance with the present invention will now be described with reference to FIG. 3. FIG. 3 is an enlarged cross-sectional view of a structure on the inner face of a transparent substrate in the third embodiment.

In the third embodiment, as shown in FIG. 3, a reflective electrode 17 is provided in place of the reflective electrode 7 in the first embodiment, and other structures are the same as those in the first embodiment. Although the third embodiment fundamentally relates to a passive matrix liquid crystal device, it is also applicable to an active matrix device, a segment-type device, and other types of liquid crystal devices.

In the third embodiment, the reflective electrode 17 is provided with irregularities having a height of, for example, approximately 0.8 μm. The irregularities remove the mirror face of the reflective electrode 17 and impart a scattering face (a white face) thereto. Scattering caused by the irregularities permits display with a wider view angle.

A method for making the reflective electrode 17 will now be described.

A photosensitive resist for the reflective electrode 17 is applied to the inner face of the transparent substrate 2 shown in FIG. 1 by spin coating or the like, and is exposed to light in which the amount of the light is adjusted by a mask having fine openings. The photosensitive resist is fired, if necessary, and is developed. Portions corresponding to the openings of the mask are selectively removed by the development to form a supporting layer 16 having a wavy cross-sectional shape as shown in the drawing. A wavy cross-sectional shape as in the supporting layer 16 shown in the drawing may be formed by selective removing or remaining at the portions corresponding to the openings of the mask by the photolithographic process, and then by smoothing the irregular shape by etching or heating. Alternatively, another layer may be deposited on the surface of the formed supporting layer to smooth the surface.

Next, a metallic thin film is vapor-deposited on the surface of the supporting layer 16 by sputtering or the like to form a reflective electrode 17 with a reflective surface. Examples of metals used include Al, CrAg, and Au. Since the shape of the reflective electrode 17 reflects the wavy surface shape of the supporting layer 16, its overall surface has irregularities. A planarization film 18 composed of a transparent resin may be formed thereon, if necessary, and then an alignment film 19 is formed thereon.

Such provision of the reflective electrode 17 can prevent direct reflection of external light in a reflective display mode, and improved visibility is achieved without diminished display brightness.

In this case, a reflective layer having the same shape as that of the reflective electrode 17 may be formed and then a transparent electrode may be formed thereon. When the reflective electrode consists of a composite of the reflective layer and the transparent electrode layer so that the reflective layer reflects external light, and the transparent electrode layer applies a liquid crystal driving voltage, the reflective electrode having irregularities functions as a transflective layer.

Figure 4:
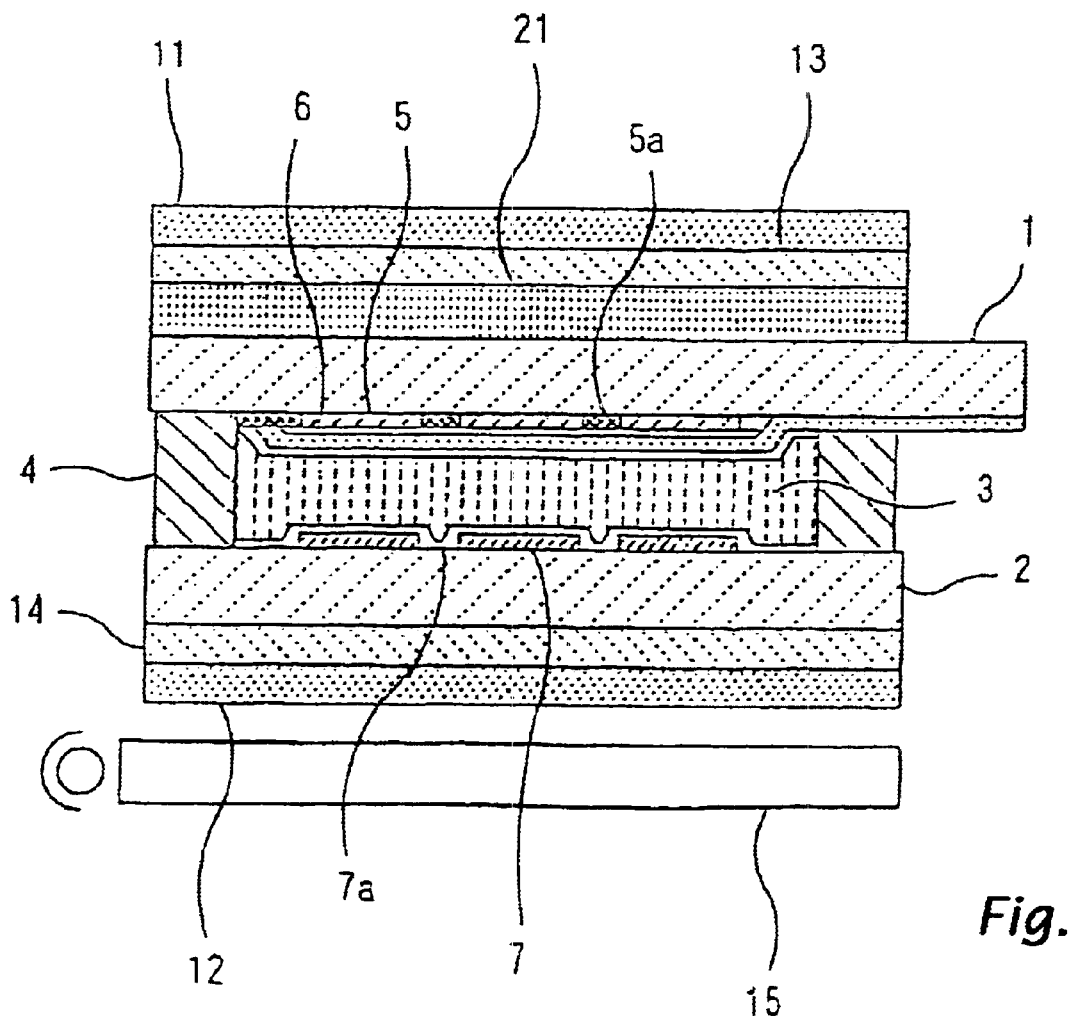
FIG. 4 is a longitudinal cross-sectional view of an outline structure in a fourth embodiment of a liquid crystal device in accordance with the present invention.

A fourth embodiment of a liquid crystal device in accordance with the present invention will now be described with reference to FIG. 4. FIG. 4 is a longitudinal cross-sectional view of an outline structure in the fourth embodiment in accordance with the present invention. In FIG. 4, the same elements as in the first embodiment shown in FIG. 1a are referred to by the same reference numerals, without further description.

As shown in FIG. 4, in the fourth embodiment, a transmissive optical diffuser 21 is disposed between the retardation film 13 and the transparent substrate 1, in addition to the structure shown in the first embodiment. The optical diffuser 21 may be of an internal diffusion type in which transparent particles are dispersed in a transparent substrate such as an acrylic resin having a different refractive index, or of a surface diffusion type in which the surface of a transparent substrate is roughened (to form a mat). The other structures are the same as those in the first embodiment.

The optical diffuser 21 can also prevent direct reflection of external light on the reflective electrode 7 in a reflective display mode, resulting in improved visibility. The position of the optical diffuser 21 is not limited to that shown in FIG. 4, as long as it is disposed forward the reflective layer. For example, the optical diffuser may be formed on the reflective electrode or the reflective layer.

Figure 5A:
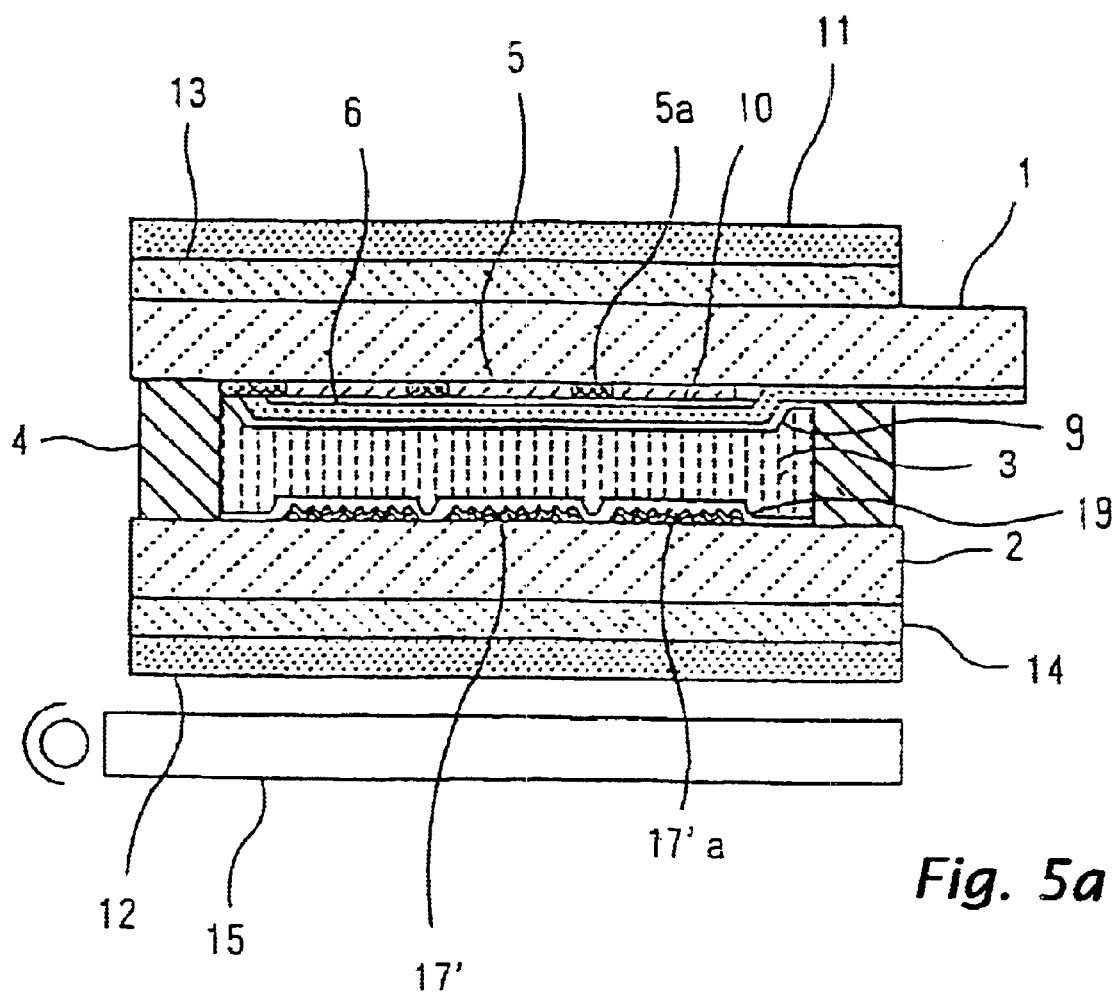
FIG. 5a is a longitudinal cross-sectional view of an outline structure in a fifth embodiment of a liquid crystal device in accordance with the present invention.
Figure 5B:
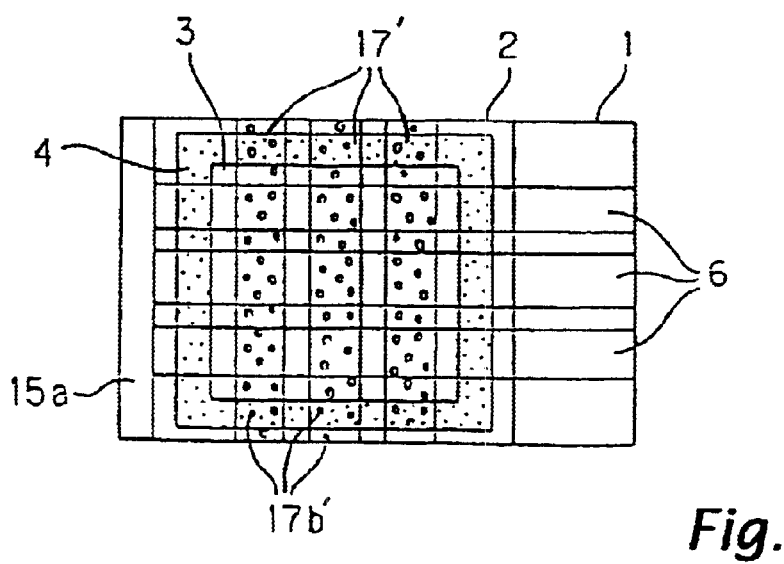
FIG. 5b is a plan view of an outline structure in a fifth embodiment of a liquid crystal device in accordance with the present invention.

A fifth embodiment of a liquid crystal device in accordance with the present invention will now be described with reference to FIGS. 5a and 5b. FIG. 5a is a longitudinal cross-sectional view of an outline structure in a fifth embodiment in accordance with the present invention, and FIG. 5b is an outline plan view in the fifth embodiment. In FIG. 5b, a color filter and a black matrix layer shown in FIG. 5a are not depicted to facilitate a view of an electrode arrangement, and only three vertical stripe electrodes and three horizontal stripe electrodes are indicated for simplicity. An actual liquid crystal device has many more stripe electrodes. In FIGS. 5a and 5b, the same elements as in the first embodiment shown in FIGS. 1a and 1b are referred to by the same reference numerals, without further description. Although the fifth embodiment fundamentally relates to a passive matrix liquid crystal device, it is also applicable to an active matrix device, a segment-type device, and other types of liquid crystal devices.

As shown in FIGS. 5a and 5b, in the fifth embodiment, reflective electrodes 17' each having many fine pores 17'a are provided in place of the reflective electrodes 7 in the first embodiment, and the other structures are the same. Light from the backlight 15 passes through fine pores 17'a of the reflective electrodes 17' in a transmissive display mode so that display on the liquid crystal is visible. After the reflective electrodes 17' are formed by vapor evaporation or sputtering, a resist layer having openings is formed by photolithography, and then the fine pores 17'a are formed by etching.

In the fifth embodiment, the fine pores 17'a ensure bright display in a transmissive display mode, and prevents reflection of external light in a reflective display mode as in the third embodiment.

Figure 6:
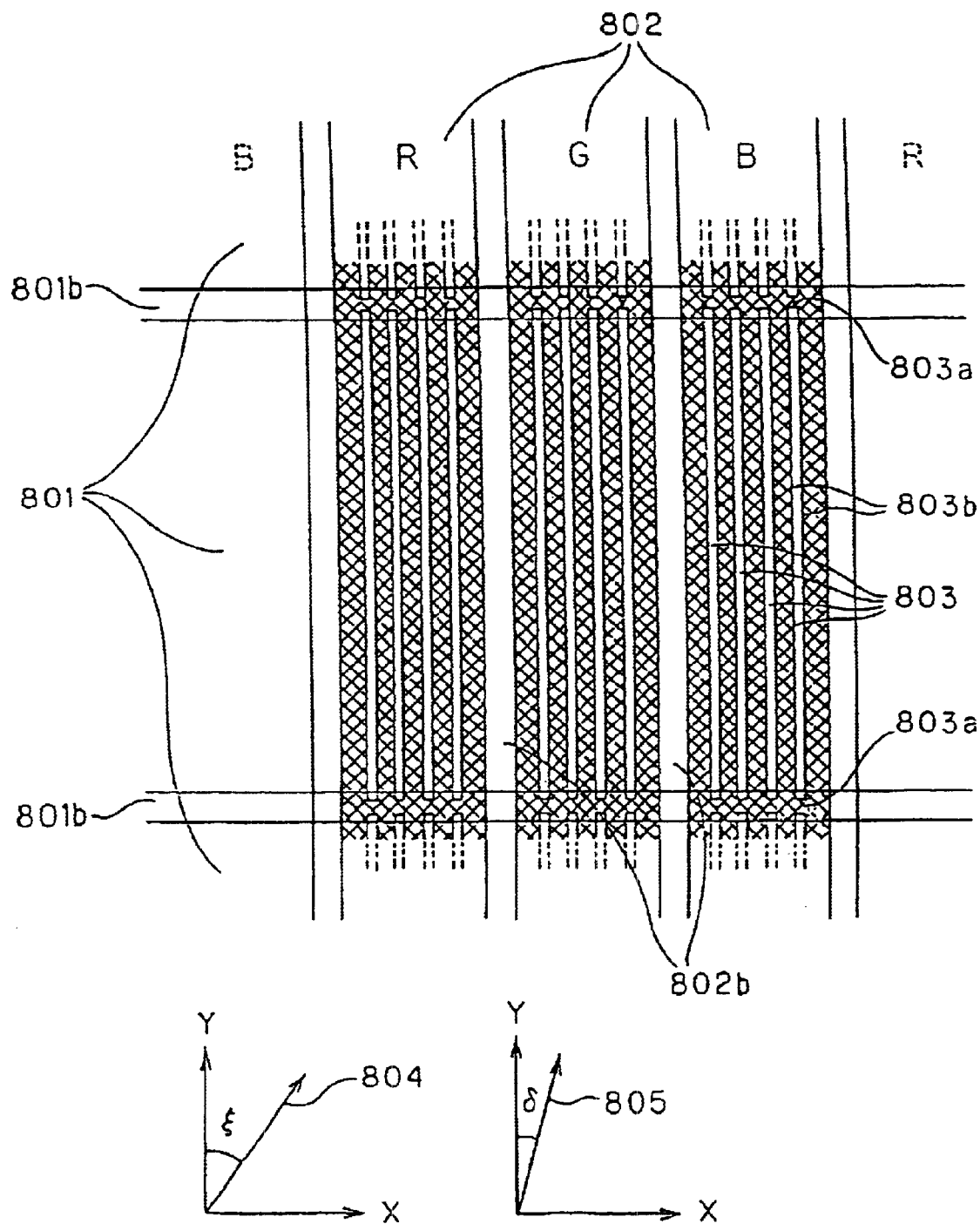
FIG. 6 is a plan view of a reflective electrode provided with slits in a sixth embodiment of a liquid crystal device in accordance with the present invention.

A sixth embodiment of a liquid crystal device in accordance with the present invention will now be described with reference to FIGS. 6 and 12. The fundamental structure in the sixth embodiment is the same as that in the first embodiment, but the structure relating to the reflective electrode 7 in the first embodiment is specified in the sixth embodiment. FIGS. 6 to 12 are plan views of reflective electrodes provided with various slits. Although the sixth embodiment fundamentally relates to a passive matrix liquid crystal device, it is also applicable to an active matrix device, a segment-type device, and other types of liquid crystal devices.

In the sixth embodiment shown in FIG. 6, a plurality of transparent electrodes 801 functioning as scanning lines are formed on the inner surface of the transparent substrate 1 (see FIG. 1) in a stripeed pattern, in which the transparent electrode 801 is an example of the transparent electrode 6. Reflective electrodes 802 as data lines are formed on the inner surface of the transparent substrate 2 (see FIG. 1), in which the reflective electrode 802 is an example of the reflective electrode 7. Each reflective electrode (data line) 802 is provided with slits 803 as an example of the openings 7b. Each reflective electrode 802 allotted to any one of red (R), green (G), and blue (B) forms one dot at a region overlapping one transparent electrode 801, and adjacent three R, G and B dots constitute one substantially square pixel. In each dot, each reflective electrode 802 has four slits 803.

Since each reflective electrode 802 has oblong slits 803 in the sixth embodiment, an oblique electric field caused by a short side 803a of each slit 803 (the in-substrate component is parallel to the longitudinal direction of the slit 803) is moderated depending the length of the long side 803b of the slit 803. That is, an oblique electric field caused by the long side 803b of the slit 803 (the in-substrate component is perpendicular to the longitudinal direction of the slit 803) controls movement of liquid crystal molecules in the vicinity of the slit. Thus, such a structure can suppress insufficient alignment of the liquid crystal which is caused by disagreement between the oblique electric field due to the short side 803a and the oblique electric field due to the long side 803b of the slit 803, and thus can suppress overall insufficient alignment of the liquid crystal caused by the oblique electric fields by the slit 803. Also, the oblique electric field due to the long side 803b can be voluntarily used for driving the liquid crystal.

In accordance with the sixth embodiment, display defects can be reduced, and electrical power consumed by the liquid crystal device can be simultaneously reduced by a reduced threshold voltage when the liquid crystal is driven. When a countermeasure is taken only for the oblique electric field due to the long side 803b of the slit 803, and no consideration is given to the oblique electric field due to the short side 803a of the slit 803, overall insufficient alignment of the liquid crystal caused by the oblique electric field can be reduced. Alternatively, voluntary use of the oblique electric field due to the long side 803b of the slit 803 facilitates overall effective use of the oblique electric field due to the slit 803.

Such oblong slits 803 can be readily formed by a photo-step using a resist, a development step, and then a peeling step. Thus, the slits 803 can be simultaneously formed when the reflective electrodes 802 are formed. The width of each slit 803 is in a range of preferably 0.01 μm to 20 μm, and more preferably 4 μm or more. Since a viewer cannot recognize such a structure, a reflective display mode and a transmissive display mode can be simultaneously achieved without deterioration of image quality due to the slit 803. Preferably, the slit 803 has an area ratio of 5% to 30% with respect to the reflective electrode 802. Such a ratio can moderate decreased brightness in a reflective display mode, and achieves a transmissive display mode by light incident on the liquid crystal layer via the slits 803 of the reflective electrodes 802.

In the sixth embodiment, a plurality of stripe reflective electrodes 802 is formed at a predetermined gap, and slits 803 extend in the longitudinal direction of the reflective electrodes 802 (the longitudinal direction in FIG. 6). Thus, a countermeasure for the oblique electric field caused by the slits 803 is effective for the oblique electric field caused by gaps 802b between the reflective electrodes 802. Furthermore, the reflective electrodes 802 and the slits 803 can be simultaneously formed; hence, the design of the mask used in the formation can be simplified. That is, a photomask for forming the reflective electrodes 802 may include a pattern for the slits 803, without providing an additional step for forming the slits 803.

In the sixth embodiment, each slit 803 extends to a position facing a gap 801b between the transparent electrodes 801. Thus, edges of each reflective electrode 802, which defines short sides 803a of each slit 803 and are opposingly disposed at a relatively large distance, lie in a gap 801b between transparent electrodes 801. Namely, since the edge is distant from a region in which a voltage is applied between the transparent electrode 801 and the reflective electrode 802, the effect of the oblique electric field due to the short side 803a of the slit 803 causing insufficient alignment of the liquid crystal can be significantly and effectively reduced.

Figure 7:
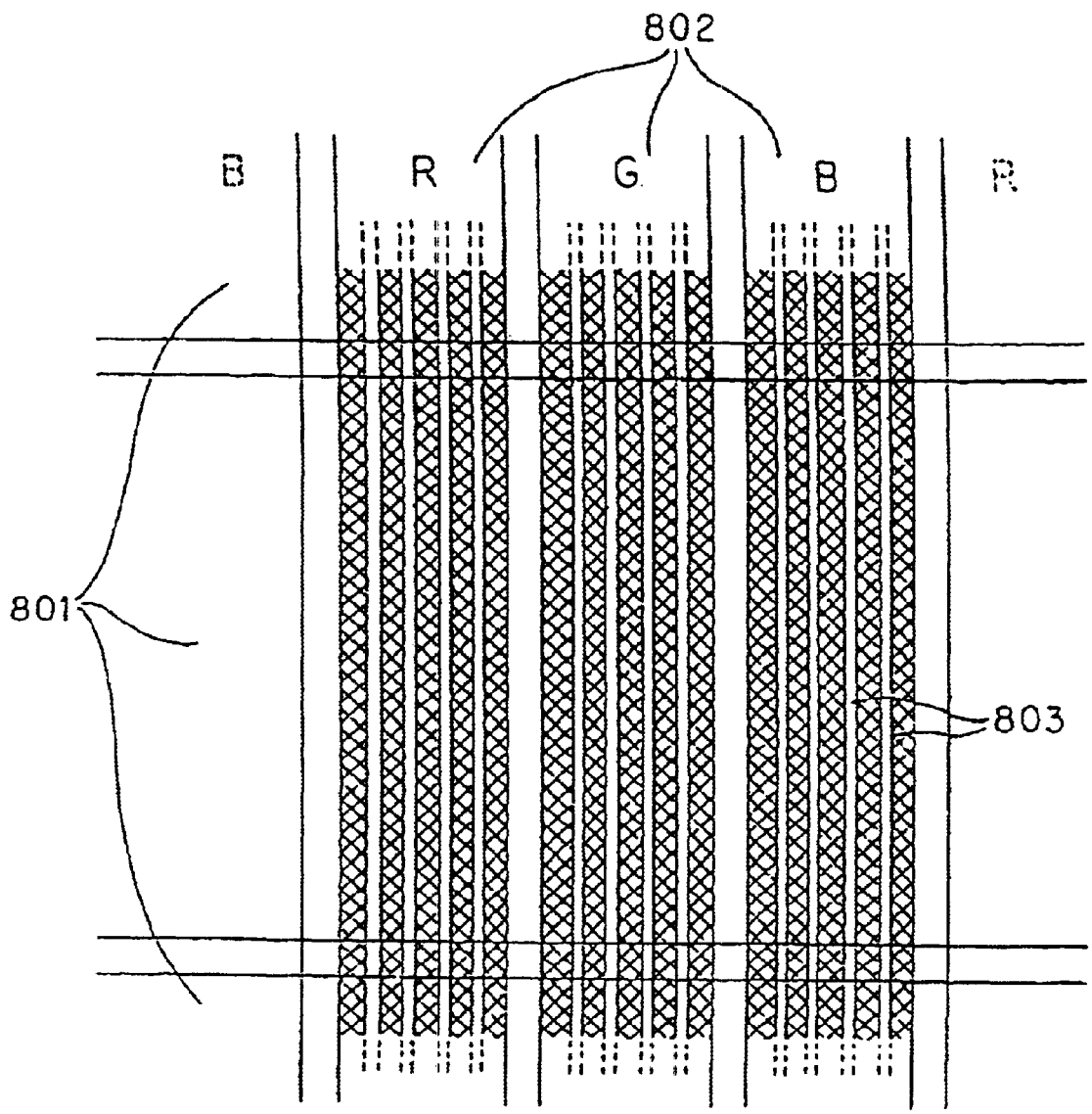
FIG. 7 is a plan view of another reflective electrode provided with slits in the sixth embodiment.

As a modification of the sixth embodiment, in consideration of this, as shown in FIG. 7, the slit 803 may extend over a plurality of pixels or may extend towards the exterior of the image display region. In such a structure, each pixel does not have or the image display area does not include the edges of reflective electrodes 802 defining short sides 803 (as not shown in FIG. 7) of slits 803 opposingly disposed at a relatively large distance; hence, the effect of the oblique electric field due to the short side 803a of the slit 803 causing insufficient alignment of the liquid crystal can be significantly and effectively reduced.

Figure 8:
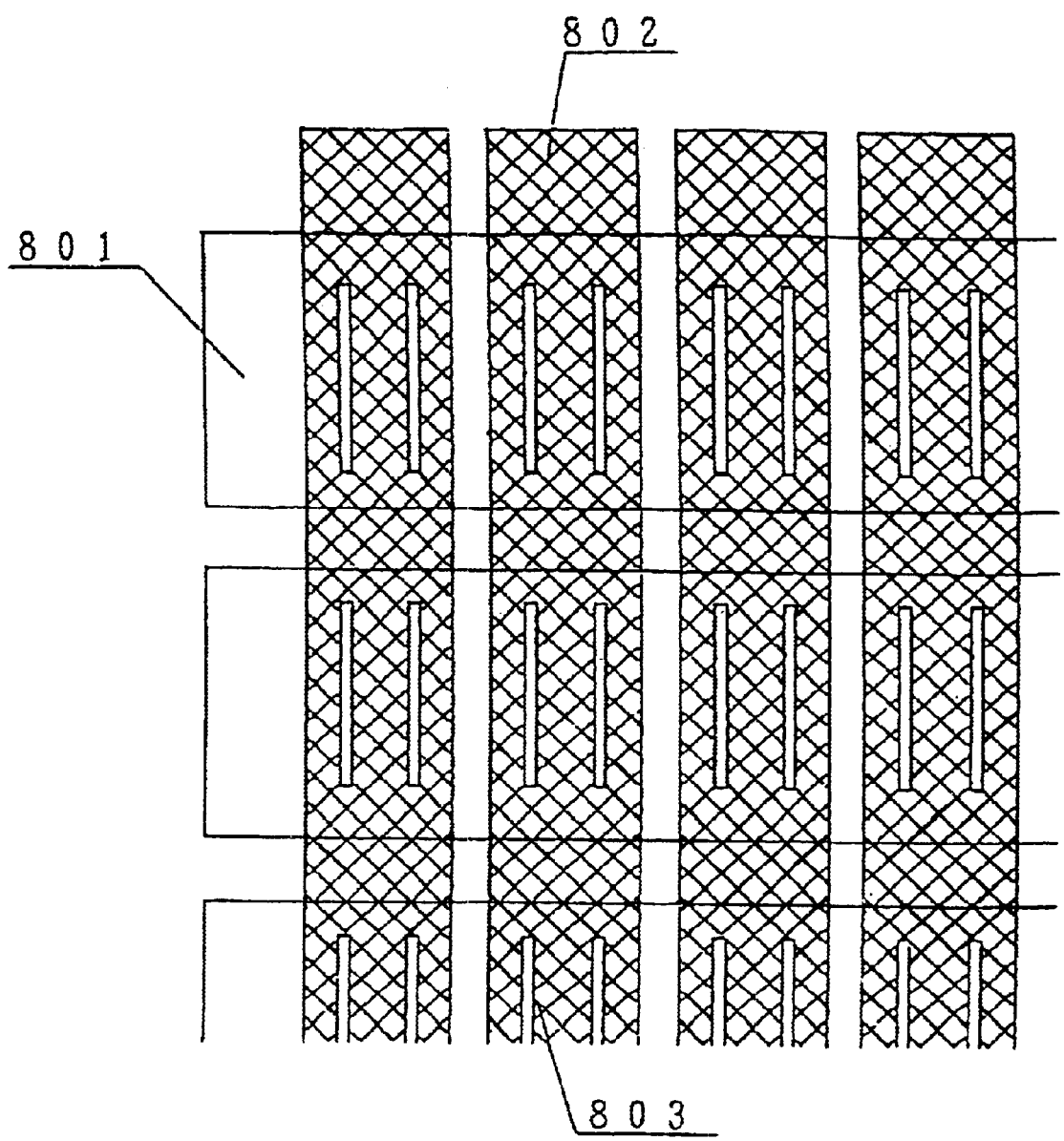
FIG. 8 is a plan view of still another reflective electrode provided with slits in the sixth embodiment.
Figure 8:
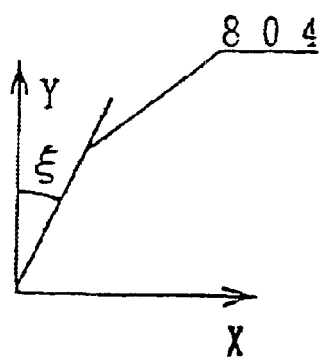
Figure 9:
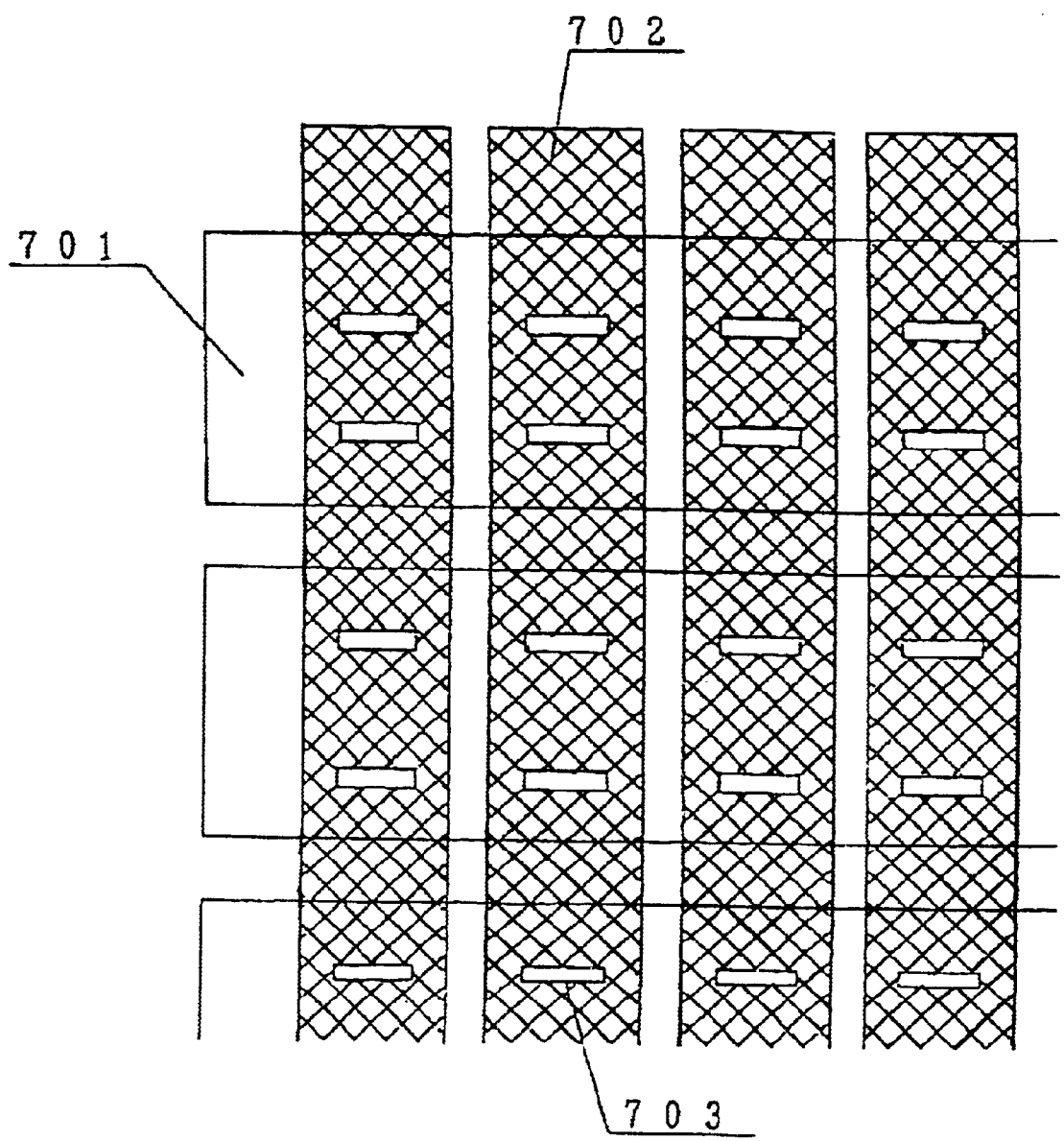
FIG. 9 is a plan view of a further reflective electrode provided with slits in the sixth embodiment.
Figure 9:
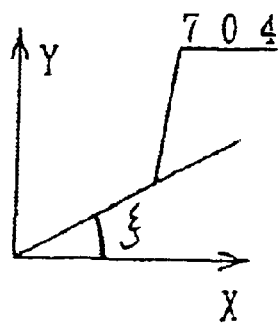
Figure 10:
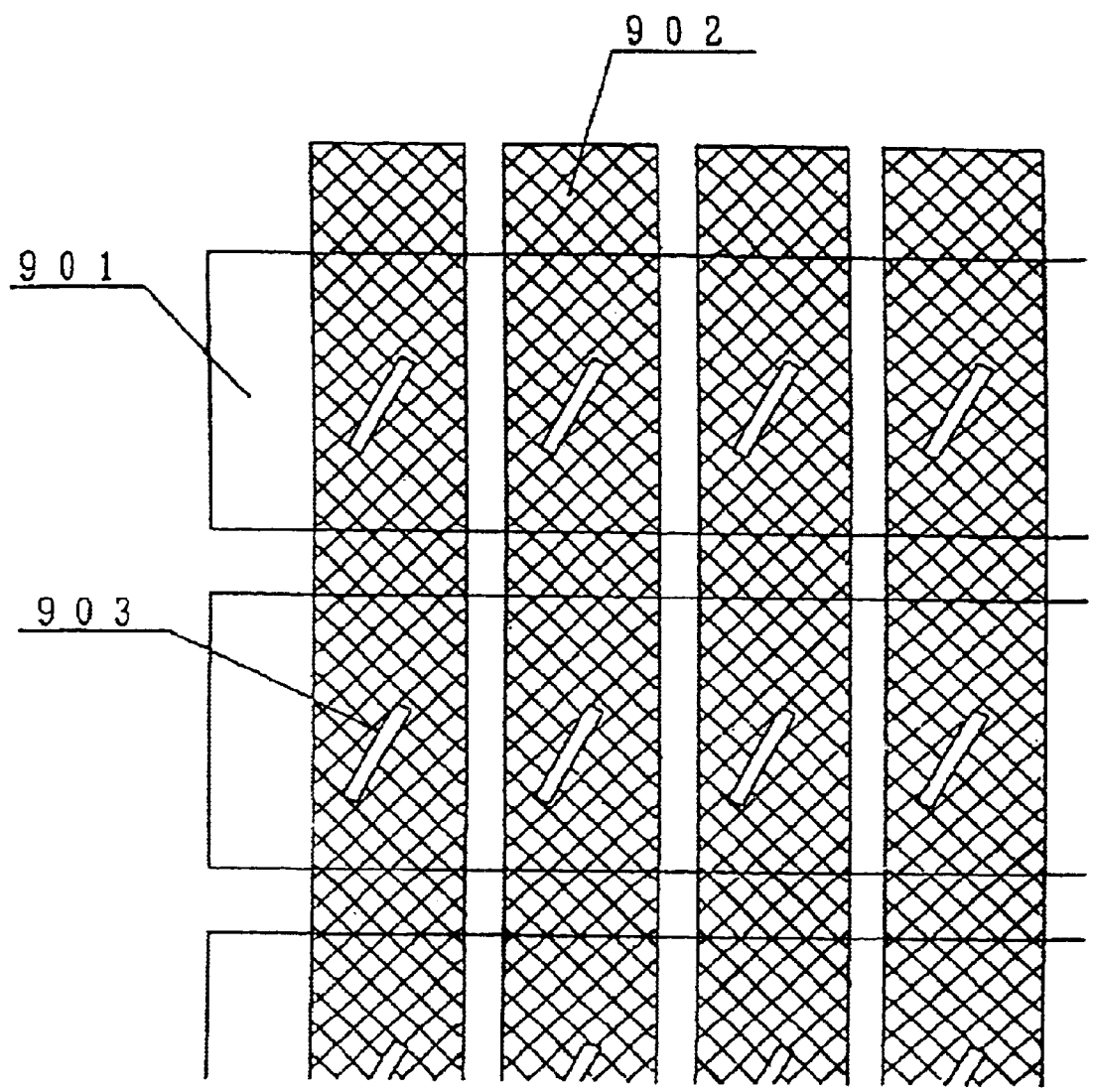
FIG. 10 is a plan view of a still further reflective electrode provided with slits in the sixth embodiment.
Figure 10:
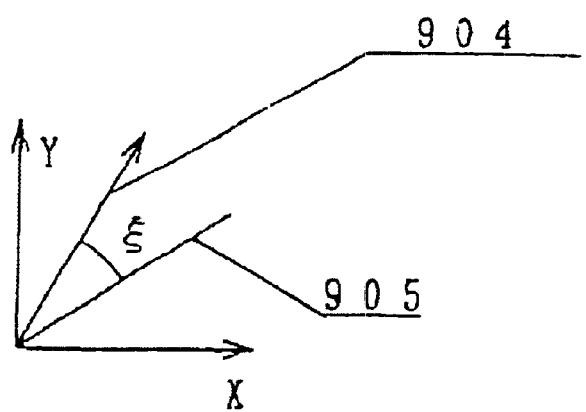
Figure 11:
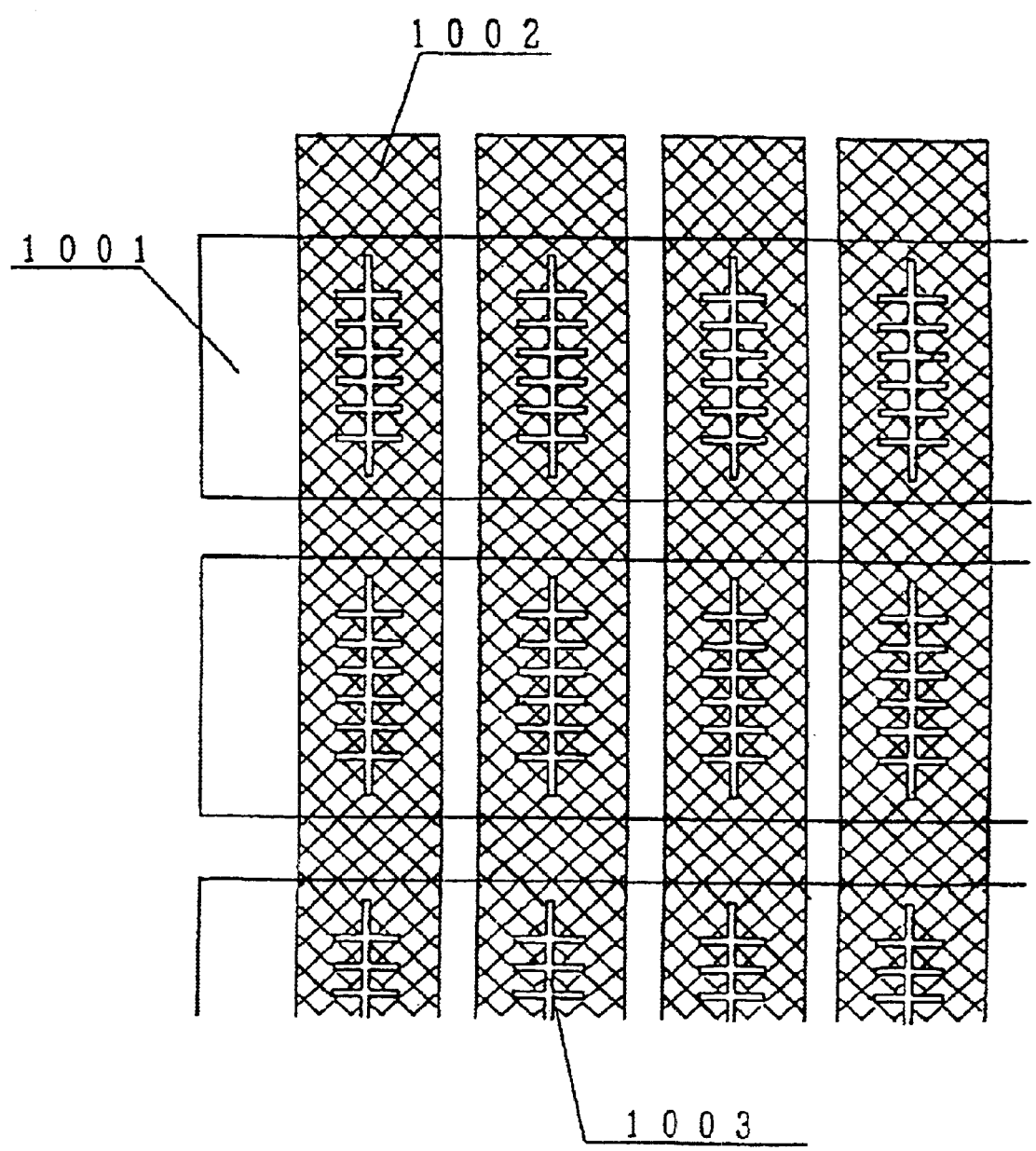
FIG. 11 is a plan view of another reflective electrode provided with slits in the sixth embodiment.
Figure 12:
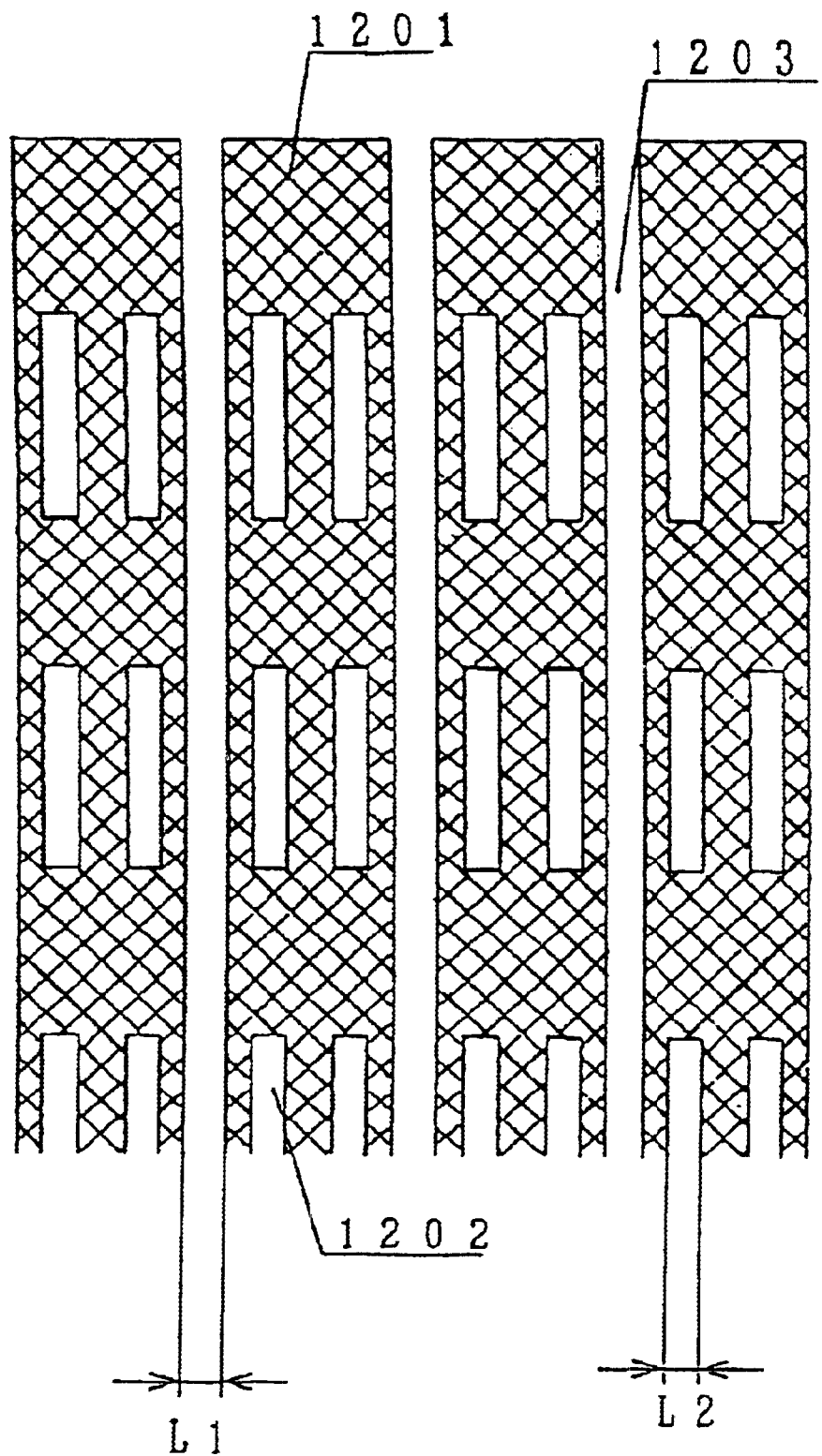
FIG. 12 is a plan view of still another reflective electrode provided with slits in the sixth embodiment.

Possible further modifications of the oblong slit 803 in the sixth embodiment include two slits 803 for one dot as shown in FIG. 8; two slits 703 for one dot, each slit having a long side in the direction perpendicular to the reflective electrode 702 (parallel to the transparent electrode 701) as shown in FIG. 9; one slit 903 for one dot, each slit having a long side in the direction slant to the reflective electrode 902 (slant to the transparent electrode 901) as shown in FIG. 10; and a slit 1003 consisting of a plurality of oblong slit elements having long sides in directions parallel to and perpendicular to the reflective electrode 1002 (parallel to and perpendicular to the transparent electrode 1001) as shown in FIG. 11.

In the sixth embodiment, as shown in FIG. 12, a width of a slit 1202 provided in a reflective electrode 1201 may be substantially equal to a gap (an interdot region) 1203 between two reflective electrodes 1201. When L1 is nearly equal to L2, wherein L1 is the width of the gap 1203 and L2 is the width of the slit 1020, a photomask does not require high design accuracy and thus can be readily designed. Furthermore, provision of such slits causes slightly increased cost.

As in the second to fourth embodiments, the sixth embodiment can include normally black mode driving, provision of a diffuser, or a reflective electrode with irregularities. In the normally black mode driving, the black matrix layer 5a may be omitted.

A seventh embodiment of a liquid crystal device in accordance with the present invention will now be described with reference to FIGS. 13 and 6 to 10.

In the seventh embodiment, attention is paid to the alignment direction of the liquid crystal molecules in the center of the liquid crystal layer disposed between the two transparent substrates in a liquid crystal device which is similar to that in the sixth embodiment.

Figure 13:
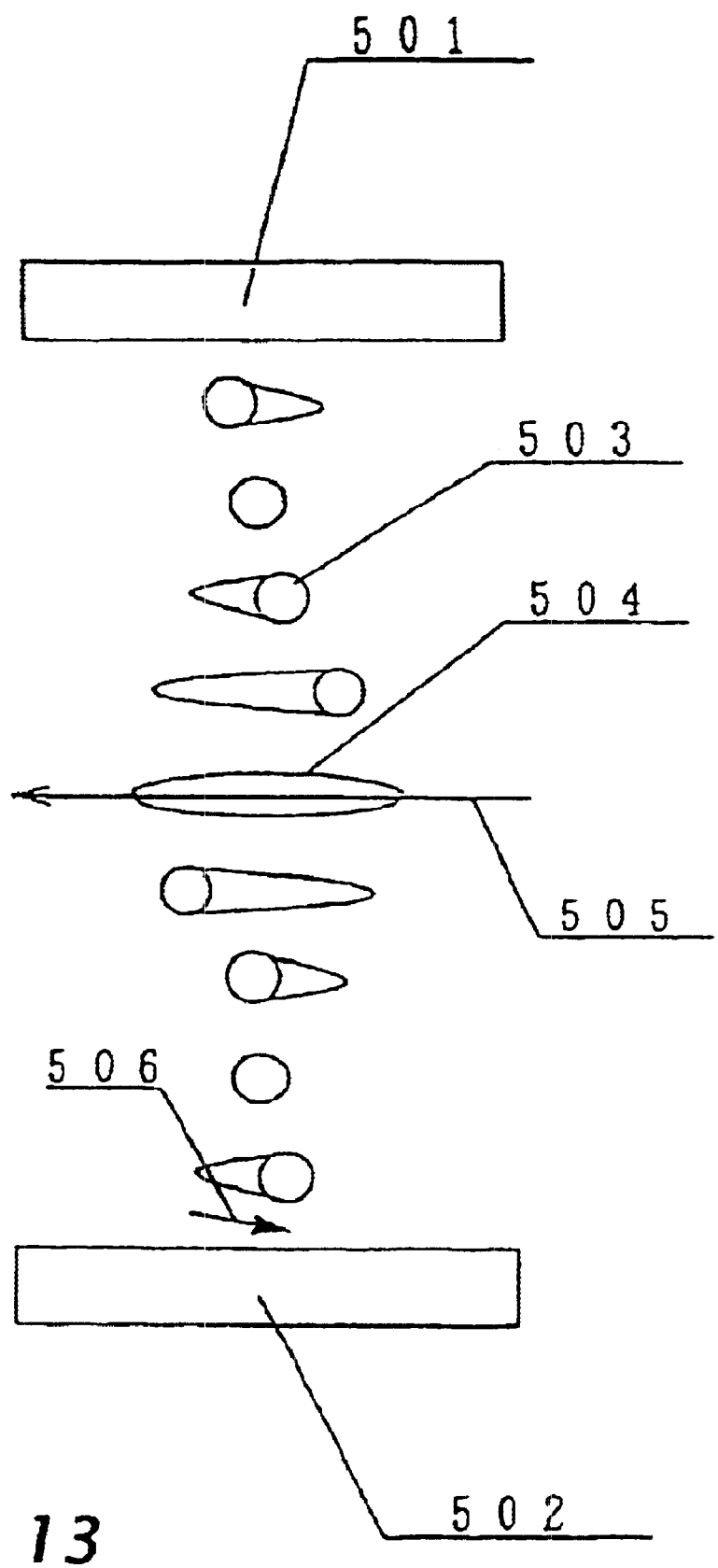
FIG. 13 is a conceptual view for illustrating the alignment direction of a liquid crystal in the center between substrates in a seventh embodiment and a ninth embodiment in accordance with the present invention.

FIG. 13 is a longitudinal cross-sectional view for illustrating the alignment direction of a liquid crystal in the center between the substrates. A liquid crystal 503 is in a predetermined twist-alignment state between two substrates 501 and 502. The long axis direction of a liquid crystal molecule 504 lying substantially in the center between the substrates is defined as an alignment direction 505.

In the seventh embodiment, with reference to FIG. 6 described above, a potential difference generated between a reflective electrode (data line) 802 and a transparent electrode (scanning line) 801 forms an oblique electric field which drives a liquid crystal on an oblong slit 803 to achieve transmissive display. As shown in FIG. 6, an angle between the longitudinal direction of the slit 803 of the reflective electrode 802 (the y direction in FIG. 6) and the alignment direction 804 of the liquid crystal molecule in the center between the substrates is defined as $\xi$. Display defects (disclination) due to a reverse tilt domain occur in a range of $-90° \leq \xi \leq -60°$ or $60° \leq \xi \leq 90°$, and thus bright, high-quality transmissive display is not achieved. A possible reason is formation of a tilt domain by orthogonal crossing of the alignment direction of the liquid crystal molecule in the center between the substrates and the longitudinal direction of the reflective electrode. The display defects formed in the region causes an inevitable increase in the threshold voltage during driving of the liquid crystal. Display defects such as disclination due to the reverse tilt domain are avoidable in a range of $-60° \leq \xi \leq 60°$, and thus bright, high-quality transmissive display is achieved. Since the display defects barely occur, the threshold voltage during driving of the liquid crystal can be reduced, resulting in reduced power consumption of the liquid crystal device. The above advantage is particularly noticeable in a range of $-30° \leq \xi \leq 30°$.

In cases of oblong slits 803 shown as modifications of the sixth embodiment in FIGS. 7 and 8, the longitudinal direction is parallel to the reflective electrode 802 as in FIG. 6, and bright, high-quality transmissive display is achieved in a range of −60°≦ξ≦60°. The above advantage is particularly noticeable in a range of −30°≦ξ≦30°.

Also, in the slits 703 and 903, as modifications of the sixth embodiment, shown in FIGS. 9 and 10, an angle between the longitudinal direction of the slit 703 of the reflective electrode 702 (the X direction in the drawings) and the alignment direction 704 of the liquid crystal molecule in the center between the substrates is defined as ξ, and an angle between the longitudinal direction 904 of the slit 903 of the reflective electrode 902 and the alignment direction 905 of the liquid crystal molecule in the center between the substrates is defined as ξ. A preferable angle is in a range of −60°≦ξ≦60°. The above advantage is particularly noticeable in a range of −30°≦ξ≦30°.

The effects of the present invention described in the seventh embodiment can be further ensured by specifying the alignment direction 506 of the liquid crystal molecule in the vicinity of the substrate 502 in FIG. 13. That is, in FIG. 6, an angle between the alignment direction 805 of the liquid crystal molecule in the vicinity of the lower substrate and the longitudinal direction (the Y direction in FIG. 6) of the slit 703 is defined as δ. A preferable angle is in a range of −30°≦δ≦30°. In a range outside −30°≦δ≦30°, the liquid crystal molecule at the substrate interface is reverse-titled by the effect of the oblique electric field to cause display defects. Limitation of the angle in a range of −30°≦δ≦30° can reduce the threshold voltage during driving of the liquid crystal, resulting in reduced power consumption of the liquid crystal device. The above advantage is particularly noticeable in a range of −10°≦δ≦10°.

Also, in modifications shown in FIGS. 7 to 10, an angle between the alignment direction of the liquid crystal molecule in the vicinity of the lower substrate and the longitudinal direction of the slit is defined as δ. A preferable angle is in a range of −30°≦δ≦30°. Limitation of the angle in a range of −30°≦δ≦30° can reduce the threshold voltage during driving of the liquid crystal, resulting in reduced power consumption of the liquid crystal device. The above advantage is particularly noticeable in a range of −10°≦δ≦10°.

As in the second to fourth embodiments, the sixth embodiment can include normally black mode driving, provision of a diffuser, or a reflective electrode with irregularities. In the normally black mode driving, the black matrix layer 5a may be omitted.

Figure 14:
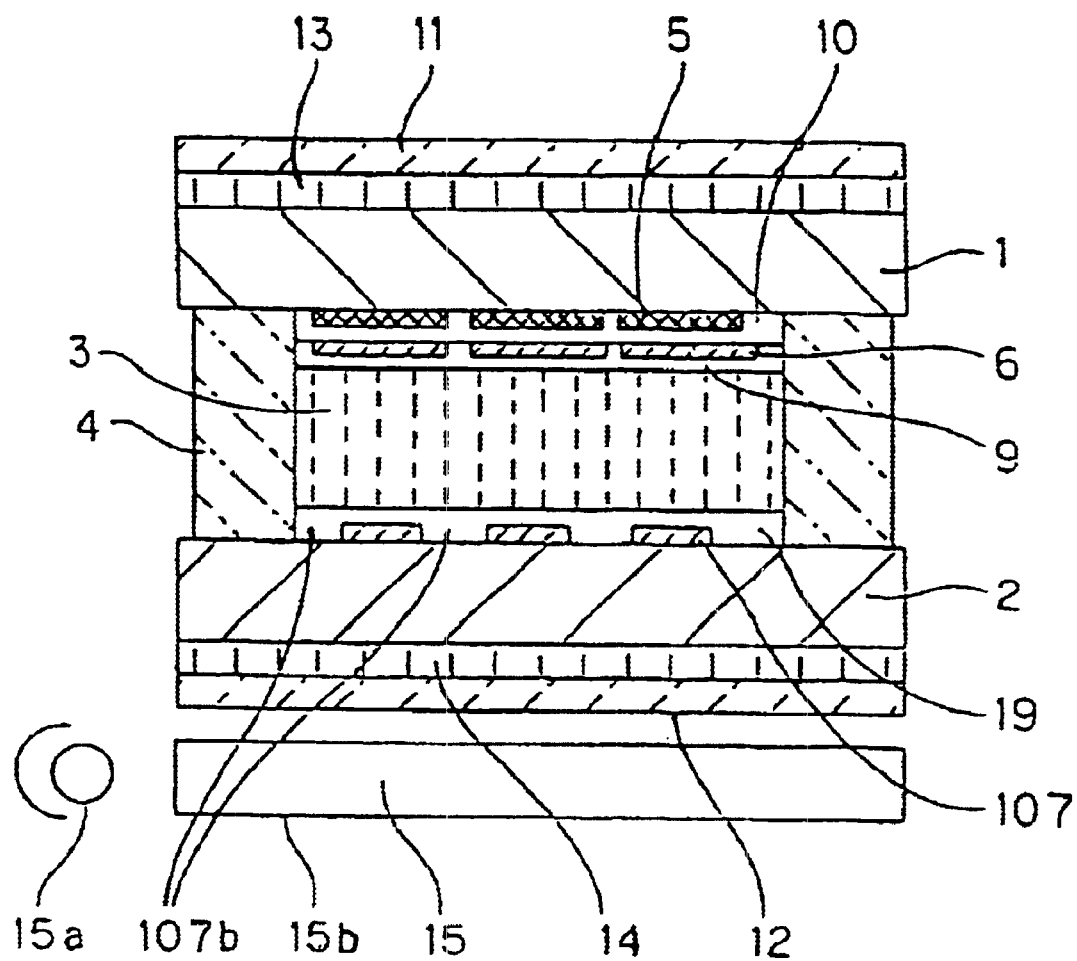
FIG. 14 is a longitudinal cross-sectional view of an outline liquid crystal device in an eighth embodiment in accordance with the present invention.
Figure 15:
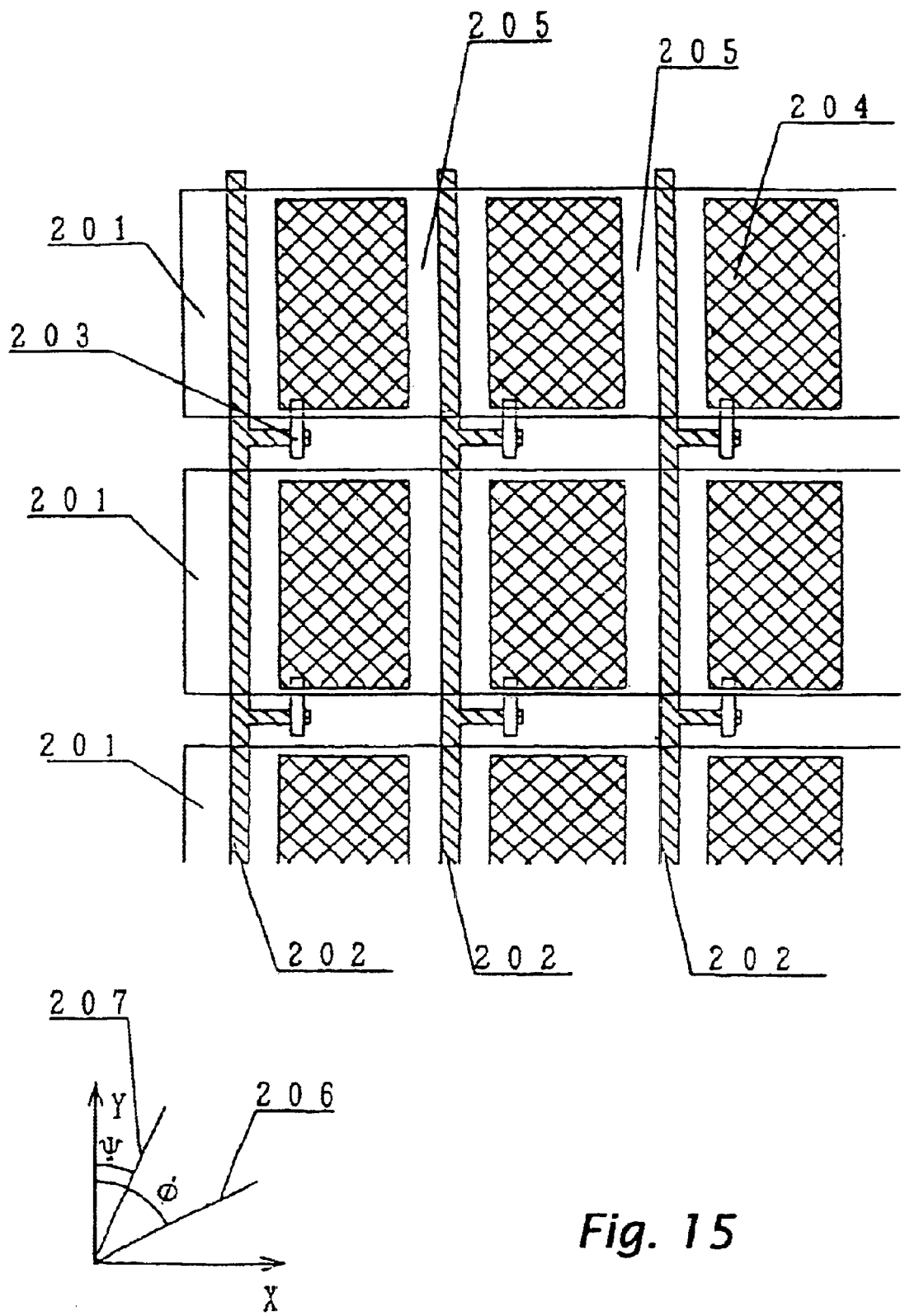
FIG. 15 is a plan view of a reflective electrode structure in the eighth embodiment.
Figure 16:
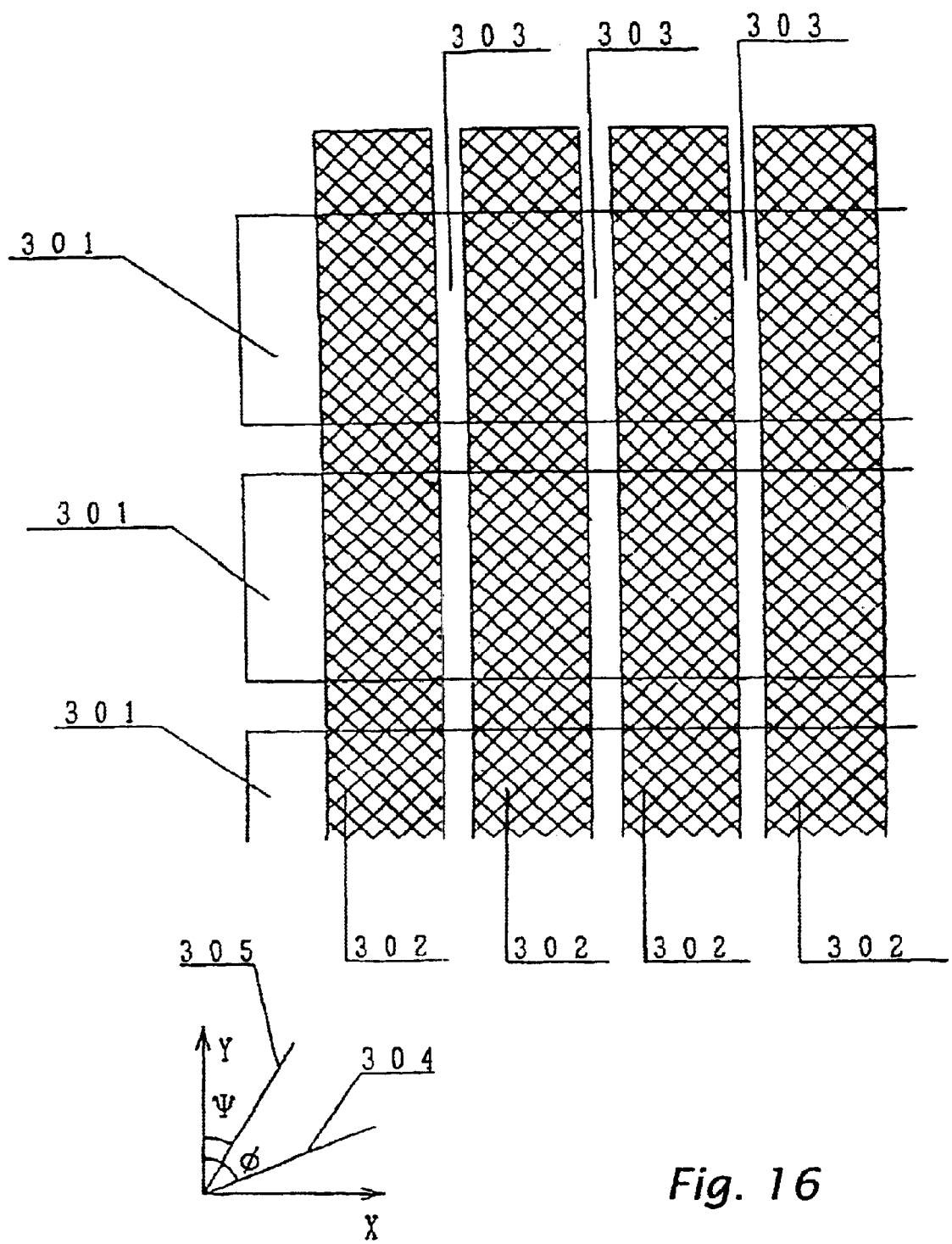
FIG. 16 is a plan view of another reflective electrode structure in the eighth embodiment.
Figure 17:
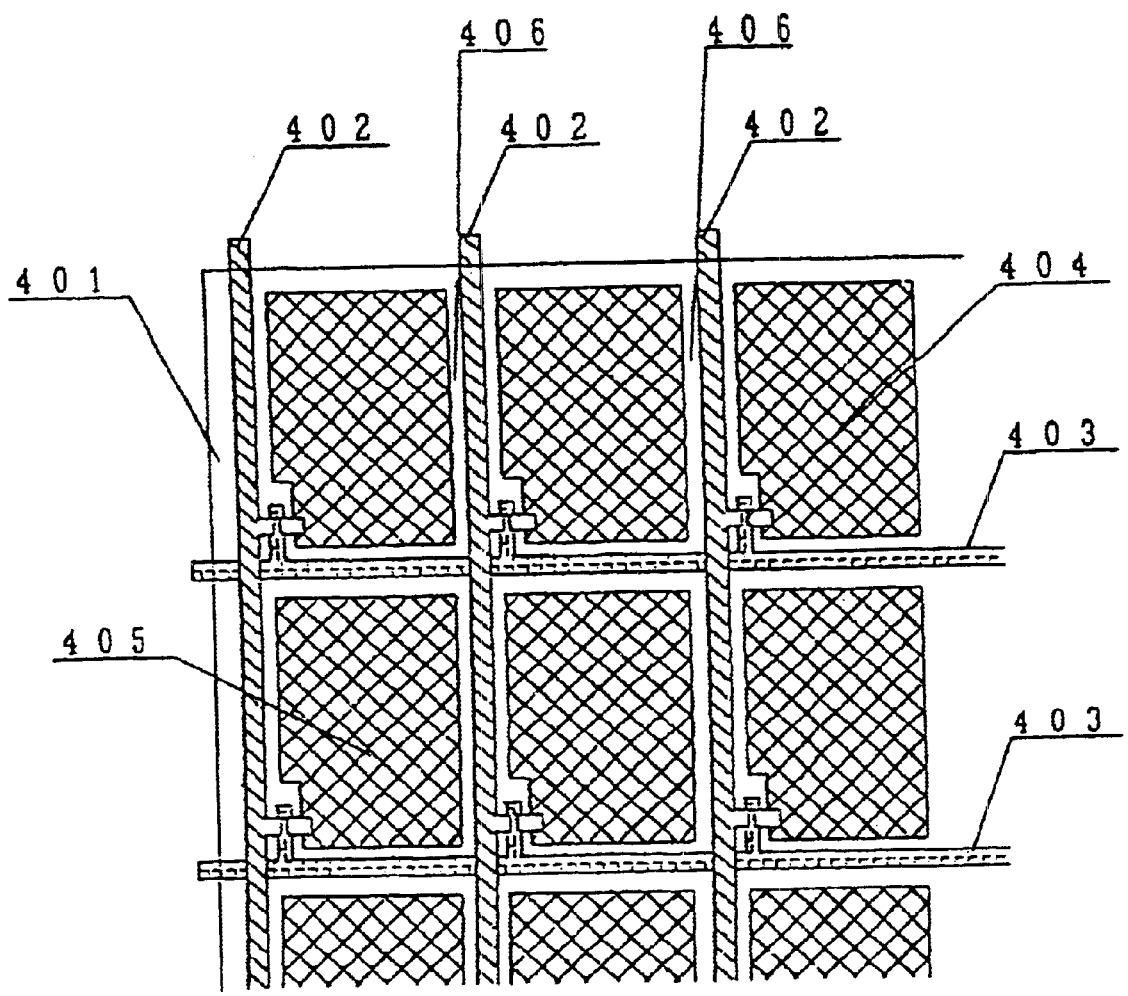
FIG. 17 is a plan view of still another reflective electrode structure in the eighth embodiment.
Figure 18:
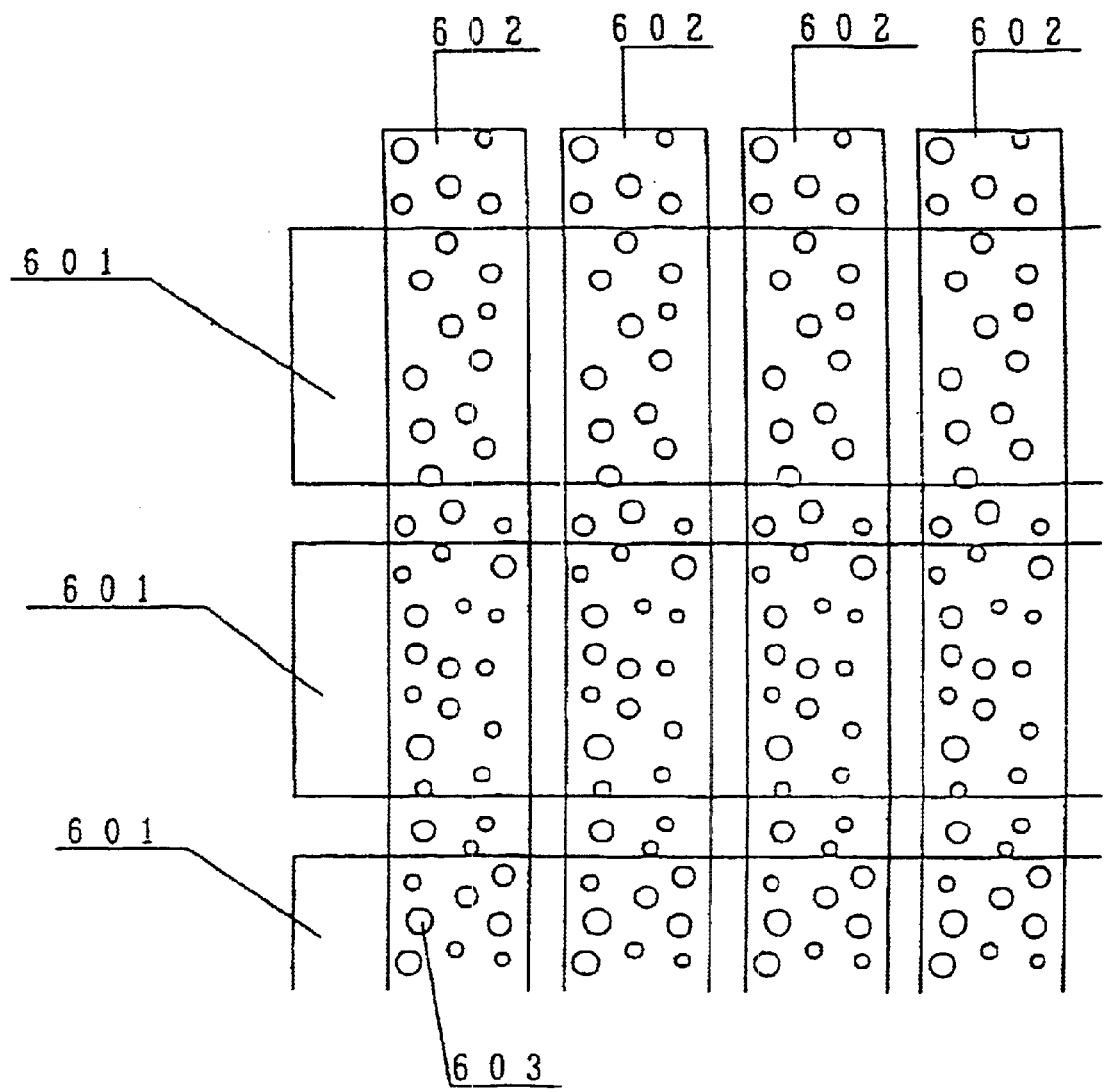
FIG. 18 is a plan view of a further reflective electrode structure in the eighth embodiment.

An eighth embodiment of a liquid crystal device in accordance with the present invention will now be described with reference to FIGS. 14 to 18. FIG. 14 is a longitudinal cross-sectional view of an outline structure in the eighth embodiment in accordance with the present invention. In FIG. 14, the same elements as in the first embodiment shown in FIG. 1a are referred to by the same reference numerals, without further description. FIGS. 15 to 17 are plan views of concrete reflective electrode structures, and FIG. 18 is a plan view of a modification of the reflective electrode.

As shown in FIG. 14, each reflective electrode 107 in the eighth embodiment is one size smaller than each respective transparent electrode 6, as compared with the first embodiment. In an active matrix device provided with TFD elements and TFT elements, the reflective electrode 114 has a rectangular shape, and is connected to a lead line via an active element. The other structures are the same as those in the first embodiment.

In the eighth embodiment, a reflective electrode 107 having a smaller area than that of a transparent electrode 6 on the inner face of a transparent substrate 1 is formed on the inner face of a transparent substrate 2 so that an oblique electric field generated between the two electrodes partly drives the liquid crystal layer 3 facing a gap 107b in which a reflective electrode 107 is not provided (thus, the gap transmits light from the backlight 15).

The operation of the eighth embodiment having the above structure will now be described.

First, a reflective display mode will be described. External light, in FIG. 14, is transmitted through a polarizer 11, a retardation film 13, a color filter 5, and passes the liquid crystal layer 3, and then is reflected by each reflective electrode 107, and emerges from the polarizer 11. Brightness of the polarizer 11 is controlled to a transmissive state (lighted state), an absorbed state (dim state), or an intermediate state therebetween in response to a voltage applied to the liquid crystal layer 3.

Next, a transmissive display mode will be described. Light from the backlight 15 is converted into a predetermined polarized light beam by a polarizer 12 and the retardation film 14, enters the liquid crystal layer 3 through each gap 107b in which a reflective electrode 107 is not formed, passes though the liquid crystal layer 3, and is transmitted through the color filter 5 and the retardation film 13. The liquid crystal layer 3 is driven by an oblique electric field between the reflective electrode 107 and the transparent electrode 6, having different sizes, and thus brightness of the polarizer 11 is controlled to a transmissive state (lighted state), an absorbed state (dim state), or an intermediate state therebetween in response to a voltage applied to the liquid crystal layer 3.

This embodiment can provide a color liquid crystal device without double imaging and blurred imaging, and which can change a display mode between a reflective mode and a transmissive mode.

In the eighth embodiment, actual structures of the transparent electrode 6 and the reflective electrode 107 which generate such an oblique electric field will be described in FIGS. 15 to 17.

FIG. 15 shows a structure in which the present invention is applied to a TFD active matrix liquid crystal device. Scanning lines 202 are formed on the inner face of a lower substrate, and a TFD element 203 and a reflective electrode 204 are formed corresponding to each dot. Transparent electrodes 201 as data lines are formed on the inner face of an upper substrate. The transparent electrode 201 has a larger area than that of the reflective electrode 204 in each pixel, and extends to the opposing region in which the reflective electrode 204 is not formed. When a driving voltage is applied to the liquid crystal, an oblique electric field is generated at the gap 205 (an edge of the reflective electrode 204) in which the reflective electrode 204 is not formed, by a potential difference between the reflective electrode 204 and the transparent electrode 201. The oblique electric field drives the liquid crystal in the vicinity of the reflective electrode 204, and transmissive display is achieved.

FIG. 16 is a structure when the present invention is applied to a simple or passive matrix liquid crystal device. Reflective electrodes 302 as data lines are formed on the inner face of a lower substrate. A plurality of transparent electrodes 301 as scanning lines is formed on the inner face of an upper electrode in a stripeed pattern. When a potential difference is generated between a reflective electrode 302 and a transparent electrode 301 at a gap 303 between reflective electrodes 302 in which the transparent electrode (scanning line) 301 is formed on the upper substrate, an oblique electric field is formed. The oblique electric field drives the liquid crystal facing the gap 303, and transmissive display is achieved.

FIG. 17 shows a structure when the present invention is applied to a TFT active matrix liquid crystal device. Gate lines 403 and scanning lines 402 are formed on the inner face of a lower substrate, and a TFT element 404 and a reflective electrode 405 are formed corresponding to each dot. A transparent electrode 401 as a common electrode (a counter electrode) is formed on the inner face of an upper substrate. The transparent electrode 401 has a larger area than that of the reflective electrode 405 in each pixel, and extends to the opposing region in which the reflective electrode 405 is not formed. Thus, an oblique electric field is generated at the gap 406 (an edge of the reflective electrode 405) in which the reflective electrode 405 is not formed, by a potential difference between the reflective electrode 405 and the transparent electrode 401. The oblique electric field drives the liquid crystal in the vicinity of the reflective electrode 405, and transmissive display is achieved.

As a modification of the eighth embodiment, as shown in FIG. 18, openings 603 may be provided in each reflective electrode 602 and transparent electrodes 601 may be provided in regions facing the openings 603. Also, in such a structure, a potential difference between the reflective electrode 602 and the transparent electrode 601 generates an oblique electric field, and the oblique electric field drives the liquid crystal at the openings 603, and transmissive display is achieved.

As in the second to fourth embodiments, the eighth embodiment can include normally black mode driving, provision of a diffuser, or a reflective electrode with irregularities. In the normally black mode driving, the black matrix layer 5*a* may be omitted.

A ninth embodiment of a liquid crystal device in accordance with the present invention will now be described with reference to FIGS. 13 to 17.

In the ninth embodiment, attention is paid to the alignment direction of the liquid crystal molecules in the center of the liquid crystal layer disposed between the two transparent substrates in a liquid crystal device which is similar to that in the eighth embodiment.

When an electrode arrangement shown in FIG. 15 in the ninth embodiment is employed, an angle between the longitudinal direction of the reflective electrode 204 (the Y direction in FIG. 15) and the alignment direction 206 of the liquid crystal molecule in the center between the substrates is defined as $\phi$. Display defects (disclination) due to a reverse tilt domain occur in a range of $-90° \leq \phi \leq -60°$ or $60° \leq \phi \leq 90°$, and thus bright, high-quality transmissive display is not achieved. A possible reason is formation of a tilt domain by orthogonal crossing of the alignment direction of the liquid crystal molecule in the center between the substrates and the longitudinal direction of the reflective electrode. The display defects formed in the region causes an inevitable increase in the threshold voltage during driving of the liquid crystal.

A table shown in FIG. 19 shows a contrast in a reflective display mode (the ratio of a reflectance at a white display mode to a reflectance at a black display mode) and a contrast in a transmissive display mode (the ratio of a transmittance at a white display mode to a transmittance at a black display mode) when the above-defined angle $\phi$ is varied. In this case, the liquid crystal mode is left-twisted by 255 degrees. As shown in the table in FIG. 19, an angle in a range of $-60° \leq \phi \leq 60°$ is essential for achieving a contrast of 10 or more which is necessary for high-quality image display in a reflective display mode and for simultaneously achieving a contrast of 5 or more which is necessary for high-quality image display in a transmissive display mode. Display defects such as disclination due to the reverse tilt domain are avoidable in a range of $-60° \leq \phi \leq 60°$, and thus bright, high-quality transmissive display is achieved. Since the display defects barely occur, the threshold voltage during driving of the liquid crystal can be reduced, resulting in reduced power consumption of the liquid crystal device. The above advantage is particularly noticeable in a range of $-30° \leq \phi \leq 30°$.

When an electrode arrangement shown in FIG. 16 is employed, an angle between the longitudinal direction of the reflective electrode 302 (the Y direction in FIG. 16) and the alignment direction 304 of the liquid crystal molecule in the center between the substrates is defined as $\phi$. Display defects (disclination) due to a reverse tilt domain occur in a range of $-90° \leq \phi \leq -60°$ or $60° C. \leq \phi \leq 90°$, and thus bright, high-quality transmissive display is not achieved. A possible reason is formation of a tilt domain by orthogonal crossing of the alignment direction of the liquid crystal molecule in the center between the substrates and the longitudinal direction of the reflective electrode. The display defects formed in the region causes an inevitable increase in the threshold voltage during driving of the liquid crystal. Display defects such as disclination due to the reverse tilt domain are avoidable in a range of $-60° \leq \phi \leq 60°$, and thus bright, high-quality transmissive display is achieved. Since the display defects barely occur, the threshold voltage during driving of the liquid crystal can be reduced, resulting in reduced power consumption of the liquid crystal device. The above advantage is particularly noticeable in a range of $-30° \leq \phi \leq 30°$.

When an electrode arrangement shown in FIG. 17 is employed, an angle between the longitudinal direction of the reflective electrode 405 (the Y direction in FIG. 17) and the alignment direction 407 of the liquid crystal molecule in the center between the substrates is defined as $\phi$. Display defects (disclination) due to a reverse tilt domain occur in a range of $-90° \leq \phi \leq -60°$ or $60° C. \leq \phi 90°0$, and thus bright, high-quality transmissive display is not achieved. A possible reason is formation of a tilt domain by orthogonal crossing of the alignment direction of the liquid crystal molecule in the center between the substrates and the longitudinal direction of the reflective electrode. The display defects formed in the region causes an inevitable increase in the threshold voltage during driving of the liquid crystal. Display defects such as disclination due to the reverse tilt domain are avoidable in a range of $-60° \leq \phi \leq 60°$, and thus bright, high-quality transmissive display is achieved. Since the display defects barely occur, the threshold voltage during driving of the liquid crystal can be reduced, resulting in reduced power consumption of the liquid crystal device. The above advantage is particularly noticeable in a range of $-30° \leq \phi \leq 30°$.

The effects of the present invention described in the ninth embodiment can be further ensured by specifying the alignment direction 506 of the liquid crystal molecule in the vicinity of the substrate 502 in FIG. 13. That is, in FIG. 15, an angle between the alignment direction 207 of the liquid crystal molecule in the vicinity of the lower substrate (TFD substrate) and the longitudinal direction of the reflective electrode 204 is defined as $\psi$. A preferable angle is in a range of $-30° \leq \psi \leq 30°$. In a range outside $-30° \leq \psi \leq 30°$, the liquid crystal molecule at the substrate interface is reverse-titled by the effect of the oblique electric field to cause display defects.

A table shown in FIG. 20 shows a contrast in a reflective display mode (the ratio of a reflectance at a white display mode to a reflectance at a black display mode) and a contrast in a transmissive display mode (the ratio of a transmittance at a white display mode to a transmittance at a black display mode) when the above-defined angle ψ is varied. In this case, the liquid crystal mode is left-twisted by 70 degrees. As shown in the table in FIG. 20, an angle in a range of −30°≦ψ≦30° is essential for achieving a contrast of 10 or more which is necessary for high-quality image display in a reflective display mode and for simultaneously achieving a contrast of 5 or more which is necessary for high-quality image display in a transmissive display mode. Display defects due to reverse tilt caused by the liquid crystal molecules at the substrate interface are avoidable in a range of −30°≦ψ≦30°. Also, in FIGS. 16 and 17, display defects such as disclination due to a tilt domain are avoidable when the angle ψ between the alignment directions 305 and 408 of the liquid crystal molecules at the substrate interfaces and the longitudinal directions of the reflective electrodes 302 and 405 is in a range of −30° to 30°. The threshold voltage during driving of the liquid crystal can be reduced, resulting in reduced power consumption of the liquid crystal device. The above advantage is particularly noticeable in a range of −10°≦ψ≦10°.

As in the second to fourth embodiments, the ninth embodiment can include normally black mode driving, provision of a diffuser, or a reflective electrode with irregularities. In the normally black mode driving, the black matrix layer 5a may be omitted.

A tenth embodiment of a liquid crystal device in accordance with the present invention will now be described with reference to FIGS. 21a to 23. The tenth embodiment includes a TFD active matrix liquid crystal device in accordance with the present invention.

Figure 21A:
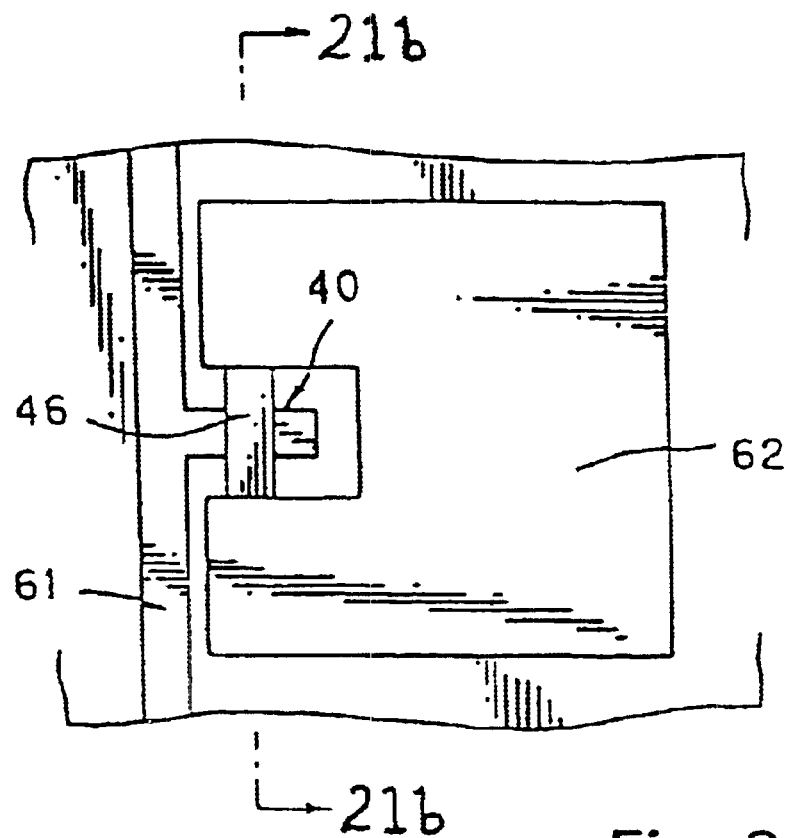
FIG. 21a is a schematic plan view of a TFD driving element and a pixel electrode in a tenth embodiment in accordance with the present invention.
Figure 21B:
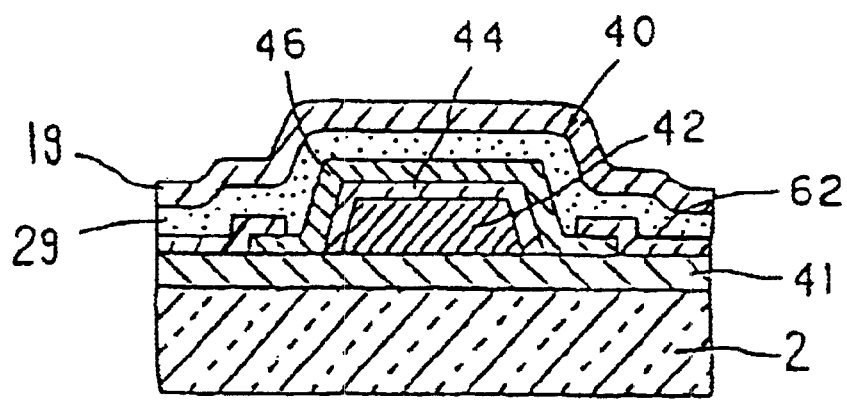

A structure in the vicinity of a TFD driving element, as an example of a diode-type nonlinear element used in this embodiment, will now be described with reference to FIGS. 21a and 21b. FIG. 21a is a schematic plan view of a TFD driving element and a pixel electrode, and FIG. 21b is a cross-sectional view taken along line B–B' in FIG. 21a. In FIG. 21b, individual layers and elements are depicted at different scales so that these layers and elements are visible in the drawing.

In FIGS. 21a and 21b, A TFD driving element 40 is formed on an underlying insulating film 41 formed on a transparent substrate 2, is composed of a first metal film 42, an insulating layer 44, and a second metal film 46, in that order from the side of the insulating film 41, and has a thin film diode (TFD) or metal-insulator-metal (MIM) structure. The first metal film 42 is connected to a scanning line 61 formed on the transparent substrate 2, and the second metal film 46 is connected to a pixel electrode 62 composed of a conductive reflective film as another embodiment of the reflective electrode. In place of the scanning line 61, a data line (described below) may be formed on the transparent substrate 2, and be connected to the pixel electrode 62, and the scanning line 61 may be provided on a counter substrate.

The transparent substrate 2 is composed of an insulating transparent substrate, for example, glass or plastic. The underlying insulating film 41 is composed of, for example, tantalum oxide. The main purpose of the formation of the insulating film 41 is to prevent separation of the first metal film 42 from the underlying layer and diffusion of impurities from the underlying layer into the first metal film 42 during heat treatment performed after deposition of the second metal film 46. When the transparent substrate 2 is composed of, for example, a quartz substrate having high thermal resistance and high purity which does not cause such separation and diffusion, the insulating film 41 can be omitted. The first metal film 42 is a conductive metal thin film composed of, for example, elemental tantalum or a tantalum alloy. The insulating film 44 is composed of, for example, an oxide film which is formed on the first metal film 42 by anodic oxidation in a chemical solution. The second metal film 46 is a conductive metal thin film composed of, for example, elemental chromium or a chromium alloy.

In this embodiment, the pixel electrode 62 has regions permitting optical transmittance, such as oblong or square slits or fine openings, as described in the above embodiments. Alternatively, each pixel is smaller than the transparent electrode on the counter electrode so that light passes through a gap therebetween.

A transparent insulating film 29 is provided on a side (the upper face in the drawing) facing the liquid crystal, such as the pixel electrode 62, the TFD driving element 40, and the scanning line 61. An alignment film 19 which is composed of an organic thin film such as a polyimide thin film and was subjected to alignment treatment such as rubbing is provided thereon.

Some examples of a TFD driving element as a diode-type nonlinear element have been described above. A diode-type nonlinear element having bi-directional diode characteristics, such as a zinc oxide (ZnO) varistor, a metal semi-insulator (MSI) driving element or a ring diode (RD), is also applicable to the reflective liquid crystal device in this embodiment.

Figure 22:
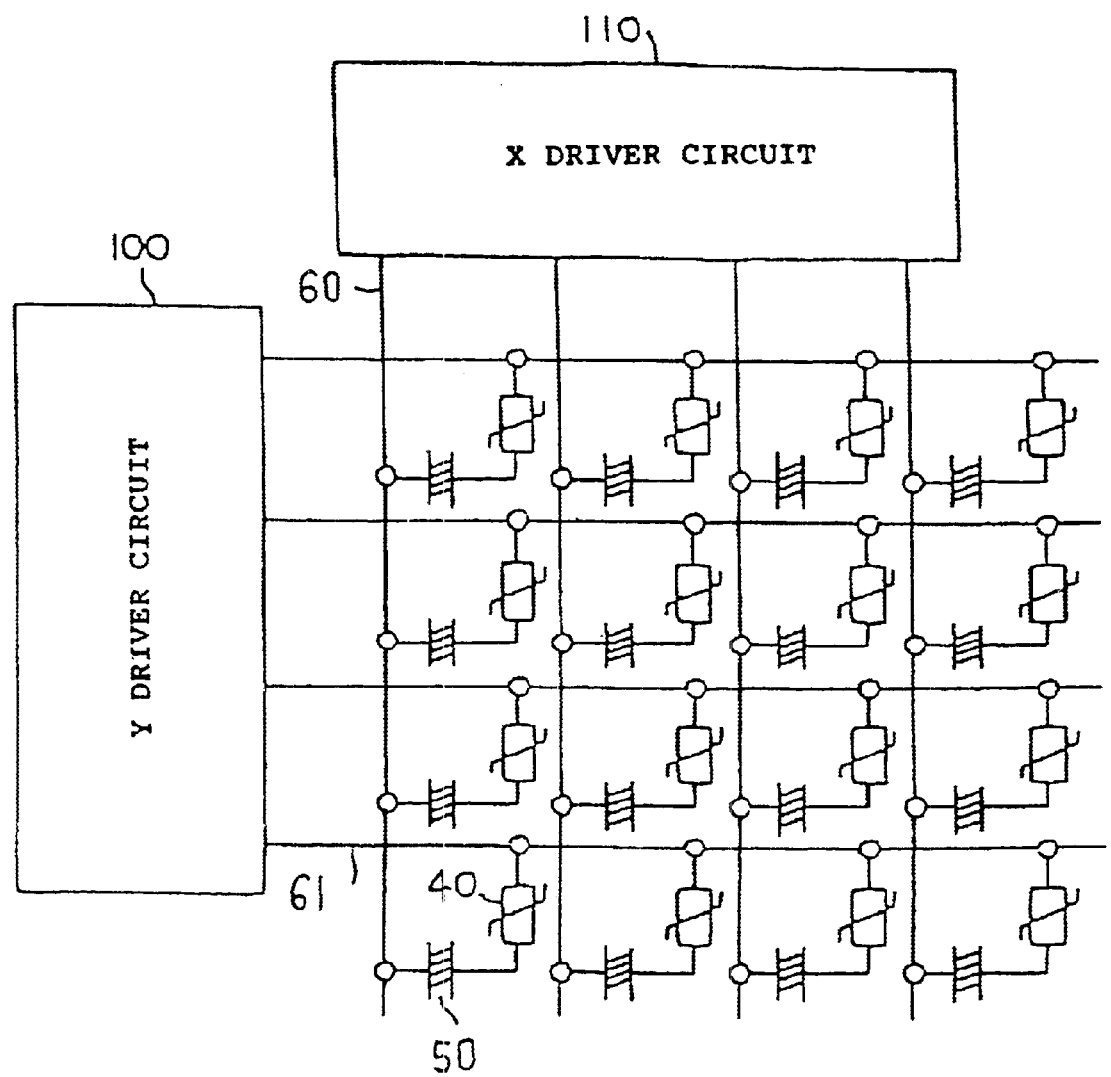
FIG. 22 is an equivalent circuit diagram of a liquid crystal device and a driving circuit in the tenth embodiment.

The structure and the operation of a TFD active matrix driving-type transflective liquid crystal device provided with TFD driving elements in accordance with the tenth embodiment will now be described with reference to FIGS. 22 and 23. FIG. 22 is an equivalent circuit diagram of a liquid crystal device and a driving circuit, and FIG. 23 is a partially broken isometric view for schematically showing the liquid crystal device.

With reference to FIG. 22, in the TFD active matrix driving-type transflective liquid crystal device, a plurality of scanning lines 61 arranged on a transparent substrate 2 is connected to a Y driver circuit 100 constituting a scanning line driving circuit, and a plurality of data lines 60 arranged on a counter substrate is connected to an X driver circuit 110 constituting a data line driving circuit. The Y driver circuit 100 and the X driver circuit 110 may be formed on a transparent substrate 2 or a counter substrate. In such a case, the transflective liquid crystal device is of a driving circuit-integrated type. Alternatively, the Y driver circuit 100 and the X driver circuit 110 are composed of external ICs which may be independent of the transflective liquid crystal device, and be connected to the scanning lines 61 and the data lines 60 via predetermined lead lines. In this case, the transflective liquid crystal device does not have these driving circuits.

In each of pixel regions arranged in a matrix, the scanning line 60 is connected to one terminal of the TFD driving element 40 (See FIGS. 21a and 21b), and the data line 60 is connected to the other terminal of the TFD driving element 40 via the liquid crystal layer 3 and the pixel electrode 62. In each pixel region, when scanning signals are supplied to the respective scanning line 61 while data signals are supplied to the respective data line 60, the TFD driving element 40 in the pixel region is turned on so that a driving voltage is applied to the liquid crystal layer 3 between the pixel electrode 62 and the data line 60 via the TFD driving element 40. Reflective display is performed by reflection of external light by the pixel electrode 62 in a lighted environment, whereas transmissive display is performed by transmission of light from a backlight as a light source through slits in the pixel electrode 62 in a dark environment.

Figure 23:
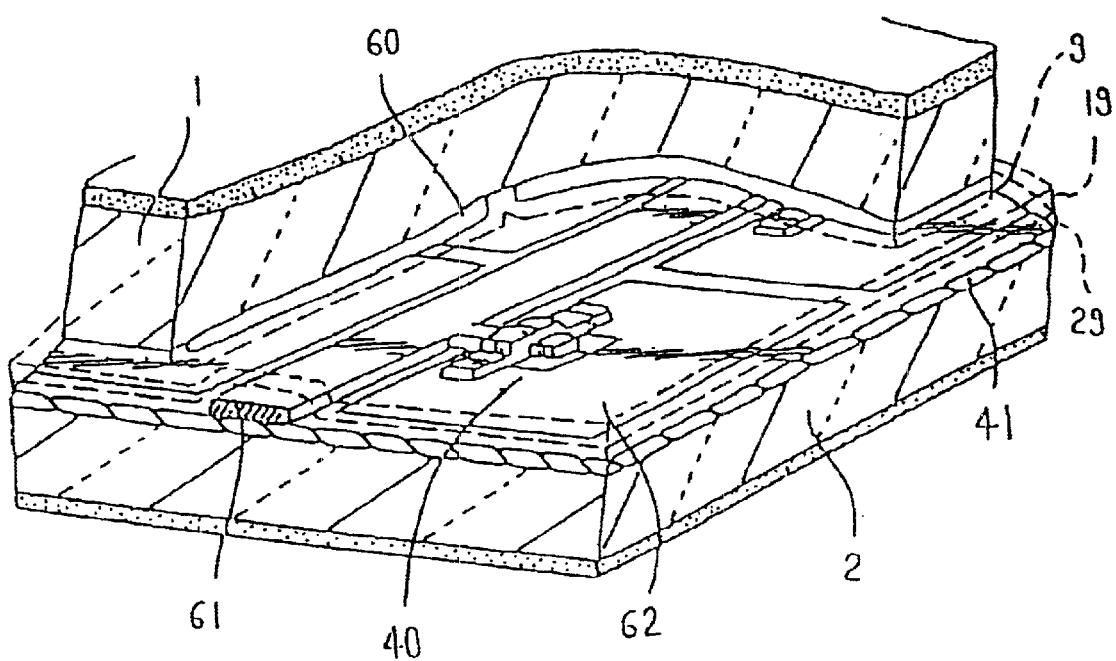
FIG. 23 is a partially broken isometric view for schematically showing the liquid crystal device in the tenth embodiment.

In FIG. 23, the transflective liquid crystal device is provided with a transparent substrate 2 and a transparent substrate (counter substrate) 1 opposingly arranged thereto. The transparent substrate 1 is composed of, for example, a glass substrate. The transparent substrate 2 is provided with pixel electrodes 62 arranged in a matrix, and each pixel electrode 62 is connected to a scanning line 61. The transparent substrate 1 is provided with a plurality of rectangular data lines 60 as transparent electrodes extending in the direction perpendicular to the scanning line 61. The data line 60 is composed of, for example, a transparent conductive thin film, such as an indium tin oxide (ITO) film. An alignment film 9 which is composed of an organic thin film such as a polyimide thin film and was subjected to alignment treatment such as rubbing is provided below the data line 60. A color filter (not shown in the drawing) composed of color films arranged in a stripeed, mosaic, or triangle pattern according to use is provided on the transparent substrate 1.

As described above, the tenth embodiment can provide a color liquid crystal device without double imaging and blurred imaging, and which can change a display mode between a reflective mode and a transmissive mode. In particular, the transflective liquid crystal device can be driven in a normally black mode by voltage control in the X driver circuit 110 and the Y driver circuit 100 as an example of driving means.

Figure 24:
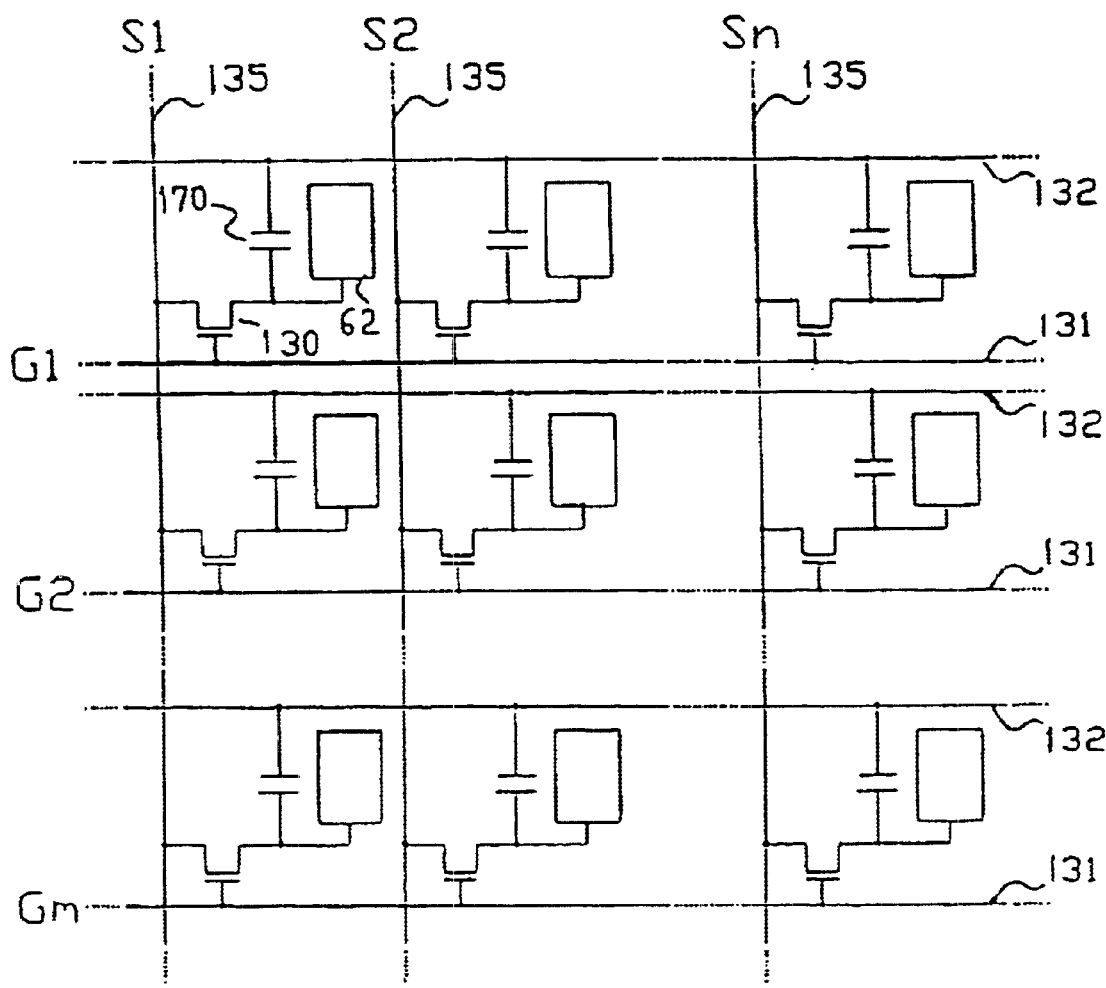
FIG. 24 is an equivalent circuit diagram of various elements and lead lines in a plurality of pixels formed in a matrix which constitutes an image display region in a liquid crystal device in an eleventh embodiment in accordance with the present invention.
Figure 25:
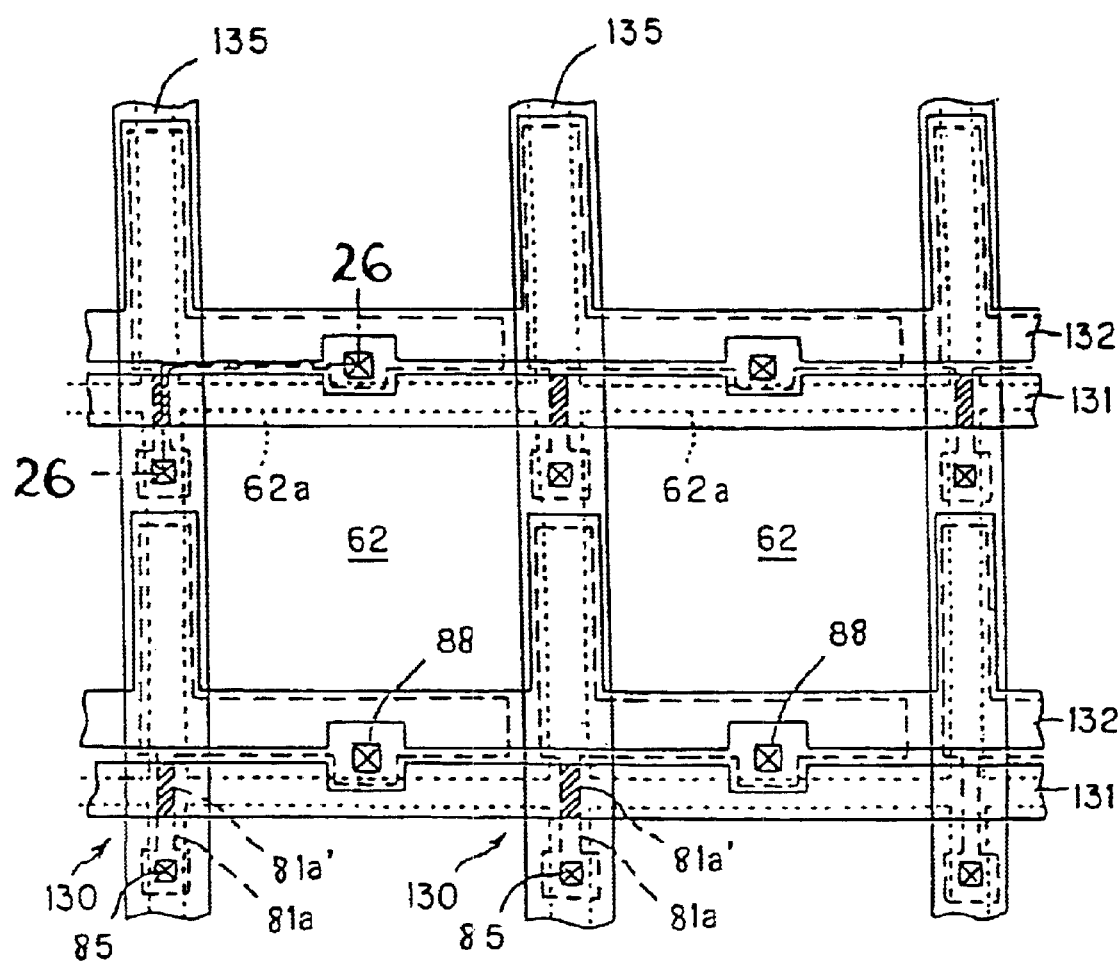
FIG. 25 is a plan view of a plurality of adjacent pixels on a transparent substrate provided with data lines, scanning lines and pixel electrodes in the eleventh embodiment.
Figure 26:
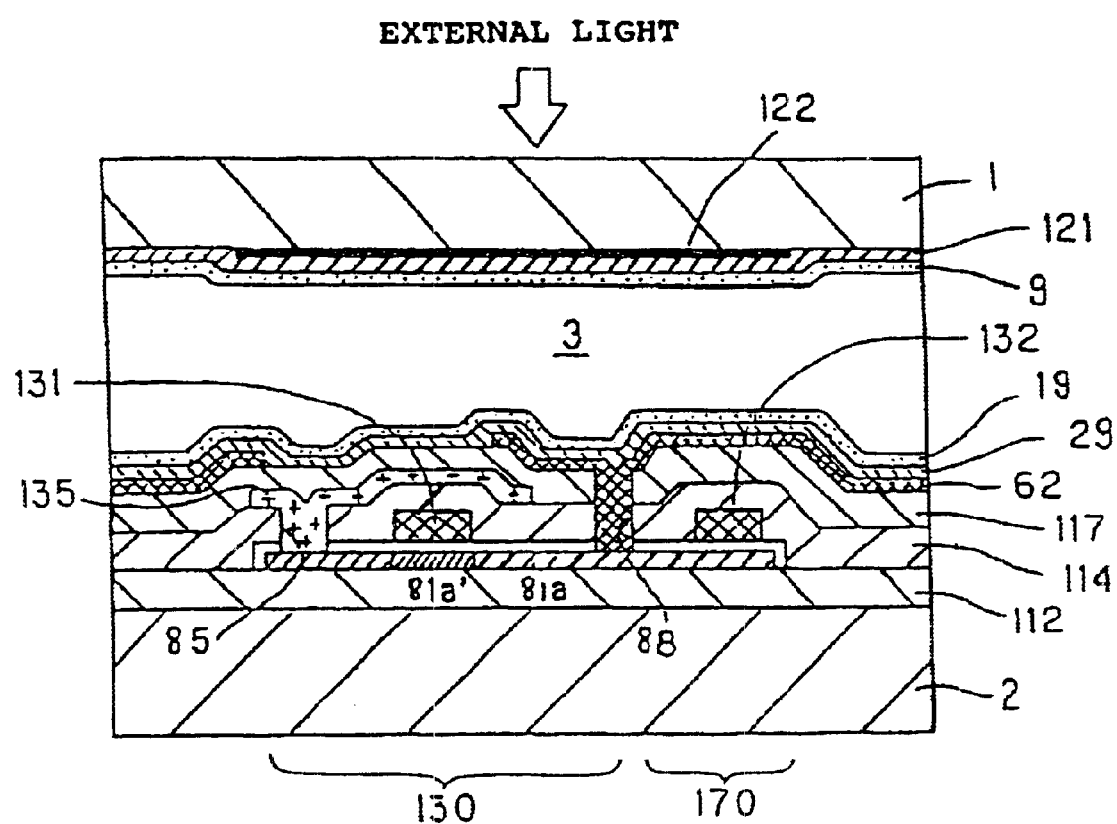
FIG. 26 is a cross-sectional view taken along line C–C' in FIG. 25.

An eleventh embodiment of a liquid crystal device in accordance with the present invention will now be described with reference to FIGS. 24 to 26. The eleventh embodiment includes a TFT active matrix liquid crystal device as a preferable application in accordance with the present invention. FIG. 24 is an equivalent circuit diagram of various elements and lead lines in a plurality of pixels formed in a matrix which constitutes an image display region in a liquid crystal device. FIG. 25 is a plan view of a plurality of adjacent pixels on a transparent substrate provided with data lines, scanning lines and pixel electrodes, and FIG. 26 is a cross-sectional view taken along line C–C', in FIG. 25. In FIG. 26, individual layers and elements are depicted at different scales so that these layers and elements are visible in the drawing.

In the TFT active matrix transflective liquid crystal device in accordance with the eleventh embodiment shown in FIG. 24, a plurality of TFTs 130 is formed in a matrix and controls pixel electrodes 62 as another example of reflective electrodes arranged in a matrix. Data lines 135 for supplying image signals are electrically connected to sources of TFTs 130. Image signals S1, S2, . . . , Sn may be sequentially supplied to the data lines 135, or may be simultaneously supplied to each group consisting of a plurality of adjacent data lines 135. The gates of the TFTs 130 are electrically connected to scanning lines 131, and pulse scanning signals G1, G2, . . . , Gm are sequentially supplied to the scanning lines 131 at a given timing. Each pixel electrode 62 is electrically connected to the drain of the TFT 130. The switch of the TFT 130 as a switching element is turned off for a predetermined term so as to input the image signals S1, S2, . . . , Sn supplied from the data lines 135 for a predetermined timing. The image signals S1, S2, . . . , Sn which are inputted to the liquid crystal via the pixel electrodes 62 and have given levels are maintained between the pixel electrode 62 and a counter electrode (described below) formed on a counter electrode (described below) for a predetermined period. A storage capacitor 170 is provided parallel to the liquid crystal capacitor formed between the pixel electrode 62 and the counter electrode in order to prevent leakage of the stored image signals.

In FIG. 25, pixel electrodes 62 (the contour 62a is shown by dotted lines in the drawing) composed of reflective films are provided in a matrix array on a transparent substrate 2 as a TFT array substrate. Data lines 135, scanning lines 131 and capacitor lines 132 are provided along horizontal and vertical boundaries between the pixel electrodes 62. Each data line 135 is electrically connected to a source region in a semiconductor layer 81a composed of a polysilicon film via a contact hole 85. Each pixel electrode 62 is electrically connected to a drain region in the semiconductor layer 81a via a contact hole 88. Each capacitor line 132 is arranged so as to oppose a first capacitor electrode extending from the drain region in the semiconductor layer 1a with an insulating film provided therebetween to form a storage capacitor 170. Each scanning line 131 is arranged so as to oppose a channel region 81a', shown by a shaded region in the drawing, in the semiconductor layer 81a, and functions as a gate electrode. As described above, a TFT 130 with a scanning line 131 as a gate electrode opposing a channel region 81a' is provided at a crossing of a scanning line 131 and a data line 135.

As shown in FIG. 26, the liquid crystal device has a transparent substrate 2, and a transparent electrode (counter substrate) 1 opposing thereto. These transparent substrates 1 and 2 are insulating and transparent substrates composed of quartz, glass, or plastic.

In this embodiment, the pixel electrode 62 has regions permitting optical transmittance, such as oblong or square slits or fine openings, as described in the above embodiments. Alternatively, each pixel is smaller than the transparent electrode on the counter substrate so that light passes through a gap therebetween.

A transparent insulating film 29 is provided on a side (the upper face in the drawing) facing the liquid crystal of the pixel electrode 62 and the TFT 40. An alignment film 19 which is composed of an organic thin film such as a polyimide thin film and was subjected to alignment treatment such as rubbing is provided thereon.

The entire face of the transparent substrate 1 is provided with a counter electrode 121 as another example of the transparent electrode, and a second shading film 122 called a black mask or black matrix is provided in the unopened region of each pixel. An alignment film 9 which is composed of an organic thin film such as a polyimide film and was subjected to a given alignment treatment such as rubbing treatment is provided under the counter electrode 121. A color filter (not shown in the drawing) composed of color films arranged in a stripeed, mosaic, or triangle pattern according to use is provided on the transparent substrate 1.

A pixel-switching TFT 130 for controlling by switching each pixel electrode 62 is provided at a position adjacent to the pixel electrode 62 on the transparent substrate 2.

As in the first embodiment, a gap surrounded by a sealant between the pair of first and second substrates 1 and 2 which are disposed so that each pixel electrode 62 and the counter electrode 121 are opposing each other is filled with a liquid crystal to form a liquid crystal layer 3.

A first insulating interlayer 112 is provided below the plurality of pixel-switching TFTs 30. The first insulating interlayer 112 is formed on the entire transparent substrate 2, and functions as an underlying film for the pixel-switching TFTs 30. The first insulating interlayer 112 is composed of, for example, a high insulating glass, such as nondoped silicate glass (NSG), phosphosilicate glass (PSG), borosilicate glass (BSG), or borophosphosilicate glass (BPSG); silicon oxide; or silicon nitride.

In FIG. 26, the pixel-switching TFT 130 includes a source region connected to a data line 135 via a contact hole 85, a channel region 81a' opposing a scanning line 131 and a gate insulating film therebetween, and a drain region connected to the pixel electrode 62 via a contact hole 88. The data line 131 is composed of a light-shading and conductive thin film such as a low resistance metal film, e.g., aluminum, or an alloy film such as metal silicide. A second insulating interlayer 114 provided with contact holes 85 and 88 is formed thereon, and a third insulating interlayer 117 provided with a contact hole 88 is formed thereon. The second and third insulating interlayers 114 and 117 are also composed of a high-insulating glass, such as NSG, PSG, BSG, or BPSG, silicon oxide or silicon nitride, as in the first insulating interlayer 112.

The pixel-switching TFT 130 may have a LDD structure, an offset structure, or a self-aligned structure. The TFT 130 may have a dual gate structure or a triple gate structure, in addition to a single gate structure.

According to the TFT active matrix driving-type transflective liquid crystal device of the eleventh embodiment, as described above, an electric field is sequentially applied to a liquid crystal portion at each pixel electrode 62 between the pixel electrode 62 and the counter electrode 121 to control the alignment state at the liquid crystal portion. Thus, reflective display is performed by reflection of external light by the pixel electrode 62 in a lighted environment, whereas transmissive display is performed by transmission of light from a backlight as a light source through slits in the pixel electrode 62 in a dark environment. Accordingly, a color liquid crystal device without double imaging and blurred imaging, and which can change a display mode between a reflective mode and a transmissive mode is achieved. In particular, electrical power is supplied to each pixel electrode 62 via the respective TFT 130; hence, crosstalk between pixel electrodes 62 can be reduced and high-quality images can be displayed.

The counter electrode on the transparent substrate 1 may be omitted, and driving may be performed by a transverse electric field, parallel to the substrate 1, between pixel electrodes 62 on the transparent substrate.

Figure 27:
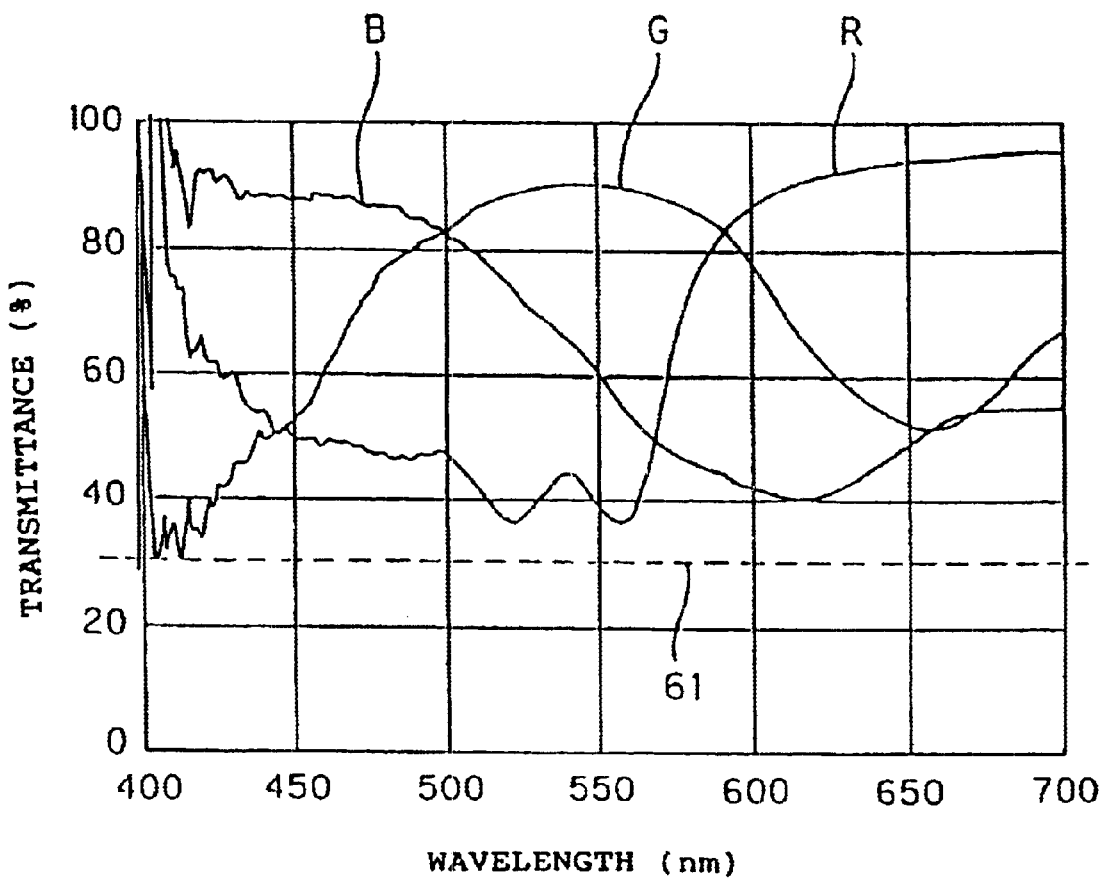
FIG. 27 is a graph showing transmittance of individual color layers in a color filter in the first or fifth embodiment.

Color layers of the color filter 5 used in the first to eleventh embodiments will now be described with reference to FIG. 27. FIG. 27 is a graph showing transmittance characteristics of individual color layers in the color filter 5. In a reflective display mode in each embodiment, incident light is transmitted through any one coloring layer of the color filter 5, passes through the liquid crystal layer 3, and is reflected by the reflective electrode 7, 17, or 17', passes through the liquid crystal layer 3 again, and is then emitted. Thus, light passes through the color filter two times, unlike in general transmissive liquid crystal devices. Use of a general color filter, therefore, causes dim display and a reduced contrast. Accordingly, in each embodiment, colors of the R, G, and B coloring layers in the color filter 5 are lighted so as to have a minimum transmittance 61 of 25 to 50% in a visible light region, as shown in FIG. 27. Color lighting of the coloring layers can be achieved by reducing the thickness of the coloring layers or by reducing the pigment or dye contents in the coloring layers. Brightness in a reflective display mode is, thereby, not lowered.

In a transmissive display mode, light passes through the light color filter 5 only one time, and thus the displayed image has a lighted color. Since the reflective electrode in each embodiment shades a large amount of light from the backlight, color lighting of the color filter 5 is advantageous to securing display brightness.

A twelfth embodiment of the present invention will be described with reference to FIG. 28. The twelfth embodiment pertaining to electronic apparatuses including liquid crystal device according to any one of the first to eleventh embodiments. That is, the twelfth embodiment includes various electronic apparatuses each using a liquid crystal device shown in any one of the first to eleventh embodiments as a display section of the portable apparatuses requiring low power consumption under various environment. FIG. 28 shows three electronic apparatuses in accordance with the present invention.

Figure 28A:
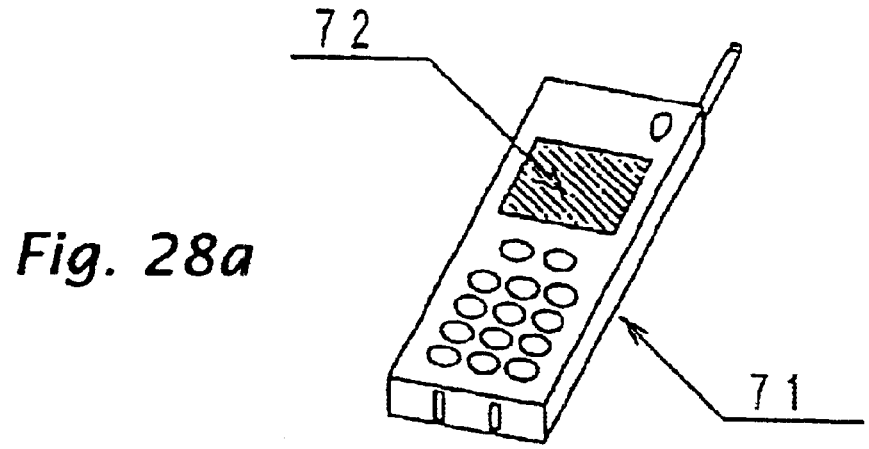
FIG. 28 includes outline isometric views of various electronic apparatuses in a twelfth embodiment in accordance with the present invention.

FIG. 28(a) shows a portable phone having a display section 72 provided on the upper front of a body 71. Portable phones are used in various environments including the interior and the exterior. They are frequently used in automobiles, but the interior of the automobile is significantly dark at night. A preferable display device used in a portable phone is a transflective liquid crystal device which is primarily used in a reflective display mode having low power consumption and is operable in a transmissive display mode using auxiliary light, if necessary. Use of a liquid crystal device according to any one of the first to eleventh embodiments as a display section 72 of a portable phone yields a portable phone having higher brightness and a high contrast in both of reflective display mode and transmissive display mode.

Figure 28B:
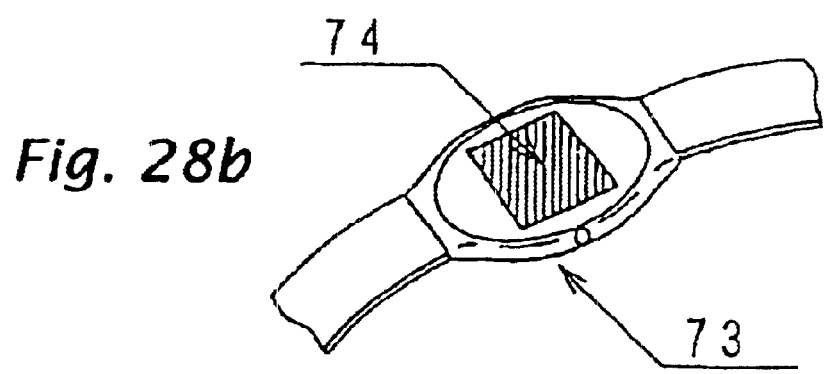

FIG. 28(b) shows a watch having a display section 74 provided in the center 73 of the body. An important point in use of the watch is a feeling of luxury. Use of a liquid crystal device according to any one of the first to eleventh embodiments of the present invention as a display section 74 of a watch achieves higher brightness and a high contrast, and reduced coloring due to a small change in properties with the wavelength of light. Thus, color display with a very luxurious feeling is achieved compared to conventional watches.

Figure 28C:
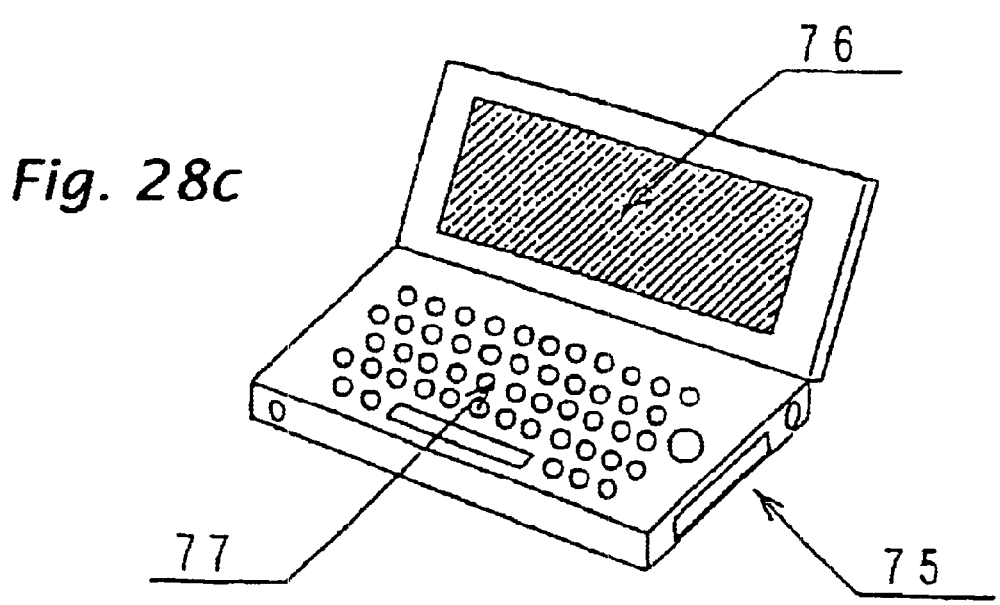

FIG. 28(c) shows a portable information apparatus having a display section 76 at the upper section and an input section 77 at the lower section of a body 75. In most cases, touch keys are provided on the front face of the display section 76. Since conventional touch keys have high surface reflectance, it is difficult to see the display. Thus, many conventional portable apparatuses use transmissive liquid crystal devices as a display section. Since the transmissive liquid crystal device uses a backlight, a large amount of power is consumed and a battery has a shortened life. Use of a liquid crystal device according to any one of the first to eleventh embodiments as a display section 76 of a portable information apparatus produces a portable information apparatus having high brightness and clarity in any of reflective, transflective, and transmissive display modes.

The liquid crystal device of the present invention is not limited to the above embodiments, and can be appropriately modified within the concept of the present invention in view of claims and the overall specification. The modified liquid crystal device is also included in the technical scope of the present invention.

Industrial Applicability

The liquid crystal device in accordance with the present invention can be used as various display devices which can display bright high-quality images in both of dark and lighted environments, and as display sections of various electronic apparatuses. Electronic apparatuses using such liquid crystal devices include liquid crystal televisions, view finder-type and monitor-viewing-type videotape recorders, automobile navigation systems, electronic notebooks, portable calculators, wordprocessors, portable phones, videophones, POS terminals, and touch panels.

What is claimed is:

1. A liquid crystal device comprising:
   a pair of first and second transparent substrates;
   a liquid crystal layer disposed between the first and second substrates;
   a transparent electrode formed on a face of the first substrate on the side of the liquid crystal layer;
   a reflective electrode formed on a face of the second substrate on the side of the liquid crystal layer and having an oblong slit; and
   an illumination unit provided at the opposite side of the second substrate on which the liquid crystal layer is provided;
   wherein the reflective electrode comprises a plurality of stripe electrodes at a predetermined gap and the slit extends in the longitudinal direction of the reflective electrode; and
   wherein the transparent electrode comprises a plurality of stripe electrodes at a predetermined gap in the direction perpendicular to the reflective electrode and the slit is disposed in a pixel region where the transparent electrode intersects the reflective electrode.

2. A liquid crystal device according to claim 1, wherein the slit extends over a plurality of pixels.

3. A liquid crystal device according to claim 2, wherein the slit extends to the exterior of the image display region.

4. A liquid crystal device according to claim 1, wherein a width of the slit is substantially equal to the gap between the two reflective electrodes.

5. A liquid crystal device according to claim 1, wherein a width of the slit is 4 µm or less.

6. A liquid crystal device comprising:
   a pair of first and second transparent substrates;
   a liquid crystal layer disposed between the first and second substrates;
   a transparent electrode formed on a face of the first substrate on the side of the liquid crystal layer;
   a reflective electrode formed on a face of the second substrate on the side of the liquid crystal layer and having an oblong slit; and
   an illumination unit provided at the opposite side of the second substrate on which the liquid crystal layer is provided;
   wherein an angle $\xi$ between the alignment direction of the liquid crystal molecule, which is substantially centered between the transparent electrode and the reflective electrode, and the longitudinal direction of the slit is in a range of $-60° \leq \xi \leq 60°$.

7. A liquid crystal device comprising:
   a pair of first and second transparent substrates;
   a liquid crystal layer disposed between the first and second substrates;
   a transparent electrode formed on a face of the first substrate on the side of the liquid crystal layer;
   a reflective electrode formed on a face of the second substrate on the side of the liquid crystal layer and having an oblong slit; and
   an illumination unit provided at the opposite side of the second substrate on which the liquid crystal layer is provided;
   wherein an angle $\delta$ between the alignment direction of a liquid crystal molecule in the vicinity of the reflective electrode and the longitudinal direction of the slit is in a range of $-30° \leq 67 \leq 30°$.

8. A liquid crystal device according to claim 1, wherein the device is in a dim or black state when not driven.

9. A liquid crystal device according to claim 1, wherein a shading layer is formed on at least one face of the first substrate on the side of the liquid crystal layer and the face of the second substrate on the side of the liquid crystal layer, so as to at least partly cover the gap between the reflective electrodes.

10. A liquid crystal device according to claim 1, further comprising a first polarizer provided on said another face of the first substrate on the opposite side of the liquid crystal layer; and
    at least one first retardation film disposed between the first substrate and the first polarizer.

11. A liquid crystal device according to claim 1, further comprising a second polarizer disposed between the second substrate and the illumination unit; and
    at least a second retardation film disposed between the second substrate and the second polarizer.

12. A liquid crystal device according to claim 1, wherein the reflective electrode contains 95% by weight or more of aluminum and has a thickness of 10 nm to 40 nm.

13. A liquid crystal device according to claim 1, further comprising a color filter provided between the reflective electrode and the first substrate.

14. A liquid crystal device according to claim 1, further comprising a diffuser provided on said another face of the first substrate, away from the liquid crystal layer.

15. A liquid crystal device comprising:
    a pair of first and second transparent substrates;
    a liquid crystal layer disposed between the first and second substrates;
    a transparent electrode formed on a face of the first substrate on the side of the liquid crystal layer;
    a reflective electrode formed on a face of the second substrate on the side of the liquid crystal layer and having an oblong slit; and
    an illumination unit provided at the opposite side of the second substrate on which the liquid crystal layer is provided;
    wherein the reflective electrode has irregularities.

16. A liquid crystal device according to claim 1, wherein the reflective electrode comprises a composite of a reflective layer and a transparent electrode layer.

17. An electronic apparatus comprising a liquid crystal device according to claim 1.

* * * * *

UNITED STATES PATENT AND TRADEMARK OFFICE
CERTIFICATE OF CORRECTION

PATENT NO. : 6,628,357 B1
DATED : September 30, 2003
INVENTOR(S) : Tsuyoshi Maeda et al.

It is certified that error appears in the above-identified patent and that said Letters Patent is hereby corrected as shown below:

Column 1,
Lines 24-25, repeated JP Patent Appln. Nos. "57-049271" should be only one reference to "JP 57-049271"

Column 4,
Line 15, "system" should be -- systems --

Column 8,
Line 62, "system" should be -- systems --

Column 10,
Line 40, delete $2^{nd}$ occurrence of "an"

Column 11,
Line 2, "system" should be -- systems --

Column 13,
Line 48, delete "an"

Column 14,
Line 25, "system" should be -- systems --

Column 22,
Line 37, "stripeed" should be -- striped --

Column 26,
Line 24, "though" should be -- through --
Line 64, "stripeed" should be -- striped --

Column 28,
Lines 21 and 43, delete "C."
Line 43, "90°O" should be -- 90° --

Column 29,
Line 2, "titled" should be -- tilted --
Line 49, "A" should be -- a --

Column 31,
Line 25, "stripeed" should be -- striped --

UNITED STATES PATENT AND TRADEMARK OFFICE
CERTIFICATE OF CORRECTION

PATENT NO.    : 6,628,357 B1
DATED         : September 30, 2003
INVENTOR(S)   : Tsuyoshi Maeda et al.

It is certified that error appears in the above-identified patent and that said Letters Patent is hereby corrected as shown below:

Column 32,
Line 56, "stripeed" should be -- striped --

Column 34,
Line 11, "pertaining" should be -- pertains --

Column 36,
Line 13, "67" should be -- $\delta$ --

Signed and Sealed this

Second Day of August, 2005

JON W. DUDAS
*Director of the United States Patent and Trademark Office*